US008356564B2

(12) United States Patent
Breker et al.

(10) Patent No.: US 8,356,564 B2
(45) Date of Patent: Jan. 22, 2013

(54) AGRICULTURAL SEEDER IMPLEMENT

(75) Inventors: Eugene Breker, Fargo, ND (US); Jake Gust, Fargo, ND (US); Darryl Justesen, Detroit Lakes, MN (US); Jack Oberlander, West Fargo, ND (US)

(73) Assignee: AGCO-Amity JV, LLC, Fargo, ND (US)

( * ) Notice: Subject to any disclaimer, the term of this patent is extended or adjusted under 35 U.S.C. 154(b) by 252 days.

(21) Appl. No.: 12/739,526

(22) PCT Filed: Oct. 23, 2008

(86) PCT No.: PCT/US2008/012067
§ 371 (c)(1),
(2), (4) Date: Jun. 24, 2010

(87) PCT Pub. No.: WO2009/054999
PCT Pub. Date: Apr. 30, 2009

(65) Prior Publication Data
US 2010/0282480 A1 Nov. 11, 2010

Related U.S. Application Data

(60) Provisional application No. 60/982,046, filed on Oct. 23, 2007, provisional application No. 61/095,168, filed on Sep. 8, 2008.

(51) Int. Cl.
*A01B 1/02* (2006.01)
*A01C 1/02* (2006.01)
*A01C 5/00* (2006.01)
(52) U.S. Cl. ........ 111/165; 111/167; 111/194; 172/187; 172/578; 172/686; 172/694
(58) Field of Classification Search .................. 172/170, 172/149, 157–169, 190–195, 109, 112, 120–122, 172/139, 140; 111/133, 184, 187, 518, 574, 111/578, 602–604, 613, 681, 685, 686, 694
See application file for complete search history.

(56) References Cited

U.S. PATENT DOCUMENTS
33,103 A 8/1861 Pond
(Continued)

FOREIGN PATENT DOCUMENTS
AU 75687 81 1/1982
(Continued)

OTHER PUBLICATIONS

International Search Report from related international application No. PCT/US2008/012067, dated Feb. 12, 2009, 2 pages.
(Continued)

*Primary Examiner* — Christopher J. Novosad
(74) *Attorney, Agent, or Firm* — Westman, Champlin & Kelly, P.A.; James L. Young

(57) ABSTRACT

A seeder implement (125) includes a fork (146) having a first spindle support arm (150) that supports a first spindle (164) and a second spindle support arm (152) that supports a second spindle (168). A first disk (160) is supported on the first spindle (164), wherein the first spindle (164) is oriented in a first orientation and at a first acute angle relative to a lateral line. The first disk (160) is oriented at a second acute angle relative to the ground surface. A second disk (166) is supported on the second spindle (168), wherein the second spindle (168) is oriented in a second orientation and at a third acute angle relative to the lateral line. The second disk (166) is oriented at a fourth acute angle relative to the ground surface. The first disk (160) is longitudinally offset ahead of the second disk (166), and there are no structural components between the first and second disks (160, 166) other than the first and second spindles (164, 168). In one embodiment, a packing wheel (142) is disposed to close and compact furrows opened by the disks (160, 166) and is disposed in the same orientation as one of the disks (160, 166).

20 Claims, 19 Drawing Sheets

U.S. PATENT DOCUMENTS

| | | | |
|---|---|---|---|
| 2,691,353 | A | 10/1954 | Secondo |
| 2,734,439 | A | 2/1956 | Padrick |
| 3,951,306 | A | 4/1976 | Ernst |
| 4,009,668 | A | 3/1977 | Brass et al. |
| 4,043,404 | A | 8/1977 | Sorlie et al. |
| 4,141,302 | A | 2/1979 | Morrison, Jr. et al. |
| 4,196,679 | A | 4/1980 | Moore |
| 4,250,968 | A | 2/1981 | Fox |
| 4,273,057 | A | 6/1981 | Pollard |
| 4,275,670 | A | 6/1981 | Dreyer |
| 4,285,444 | A | 8/1981 | Tye |
| 4,289,081 | A | 9/1981 | Koronka |
| 4,307,674 | A | 12/1981 | Jennings et al. |
| 4,469,185 | A | 9/1984 | Fox et al. |
| 4,528,920 | A | 7/1985 | Neumeyer |
| 4,539,921 | A | 9/1985 | Morlock |
| 4,561,565 | A | 12/1985 | Wolf et al. |
| 4,671,193 | A | 6/1987 | States |
| 4,785,890 | A | 11/1988 | Martin |
| 4,796,550 | A | 1/1989 | Van Natta et al. |
| 5,318,133 | A | 6/1994 | Logue |
| 5,341,754 | A | 8/1994 | Winterton |
| 5,626,196 | A | 5/1997 | Hughes |
| 5,685,245 | A | 11/1997 | Bassett |
| 5,709,271 | A | 1/1998 | Bassett |
| 5,752,454 | A | 5/1998 | Barton |
| 6,032,593 | A | 3/2000 | Wendling et al. |
| 6,125,775 | A | 10/2000 | Gust |
| 6,253,692 | B1 | 7/2001 | Wendling et al. |
| 6,345,671 | B1 | 2/2002 | Siemens et al. |
| 6,347,594 | B1 | 2/2002 | Wendling et al. |
| 6,530,334 | B2 | 3/2003 | Hagny |
| 6,688,245 | B2 | 2/2004 | Juptner |
| 6,715,433 | B1 | 4/2004 | Friestad |
| 6,834,598 | B2 | 12/2004 | Juptner |
| 7,216,596 | B2 | 5/2007 | Jones |
| 2005/0072344 | A1 | 4/2005 | Kester |
| 2006/0162632 | A1 | 7/2006 | Bourgault |

FOREIGN PATENT DOCUMENTS

| | | |
|---|---|---|
| AU | 34437 95 | 8/1996 |
| DE | 1601779 | 11/1981 |
| EP | 0406939 | 1/1991 |
| EP | 0540995 | 5/1993 |
| EP | 0772963 | 7/1996 |
| JP | 2005-117913 | 5/2005 |
| RU | 2298907 | 8/2005 |
| SU | 42357 | 3/1935 |
| WO | 95/09524 | 4/1995 |

OTHER PUBLICATIONS

John Deere brochure, "Air-Seeding Equipment—Air Drills, Air-Hoe Drills, Air-Disk Drills, Commodity Systems" (32 pages), publically available at least prior to Sep. 8, 2008.

International Preliminary Report on Patentability for related PCT Application No. PCT/US2008/012067, dated Apr. 27, 2010 (2 pages).

Written Opinion of the International Searching Authority for related PCT Application No. PCT/US2008/012067, dated Feb. 12, 2009 (4 pages).

First Office Action, State Intellectual Property Office of Peoples' Republic of China, dated Jun. 5, 2012, from Chinese Patent Application No. 200880112911.6 (8 pages).

Australian Patent Examination Report No. 1 for Australian Patent Application No. 2008317368, Nov. 16, 2012 (3 pages).

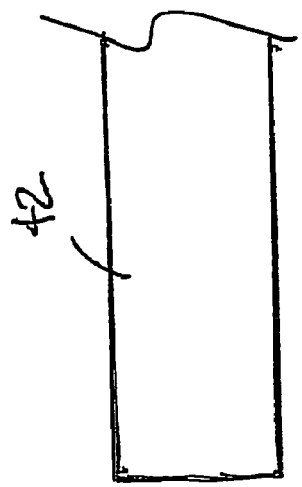
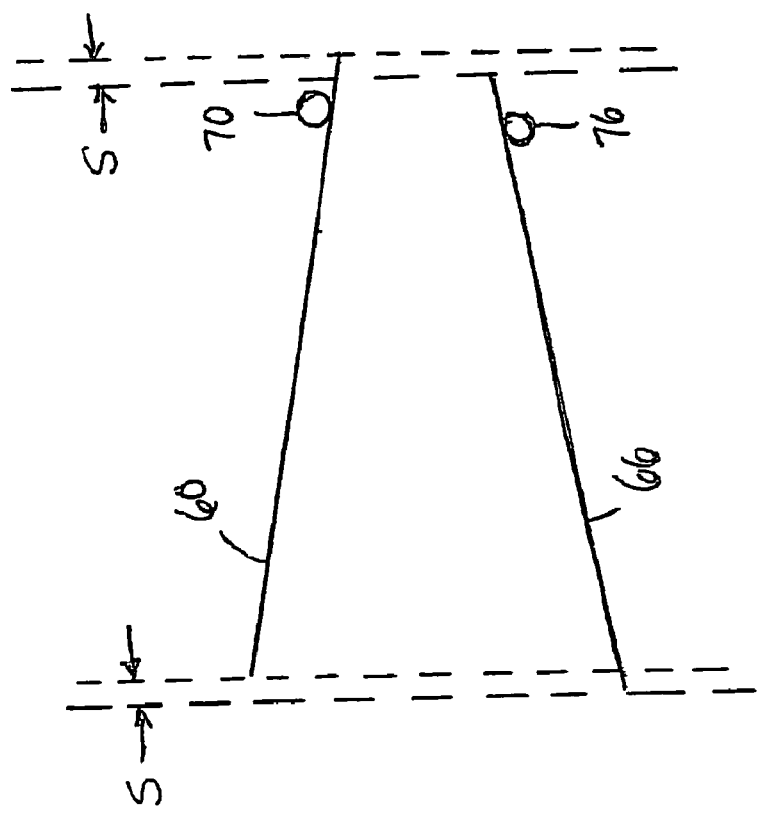
FIG. 9

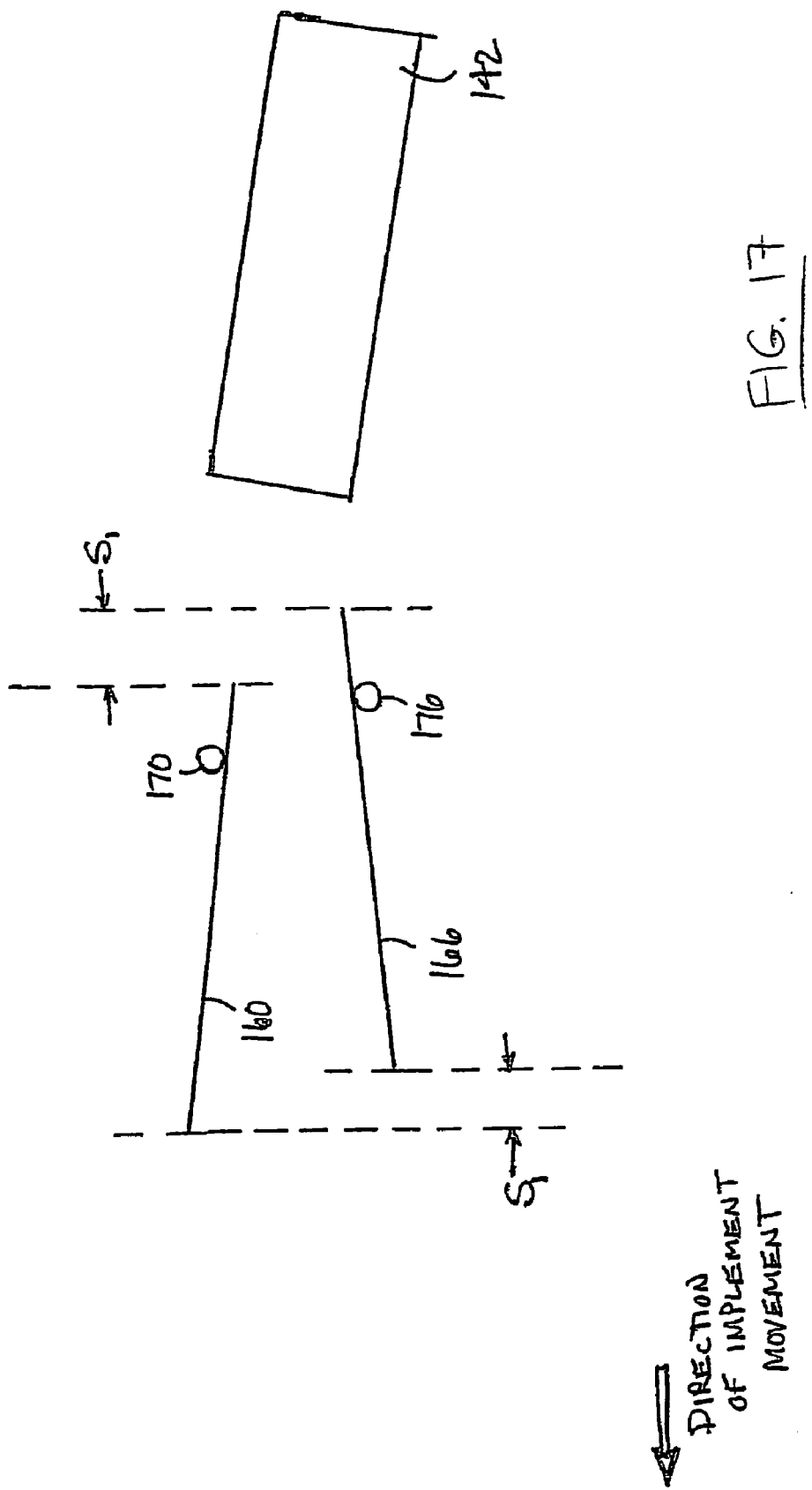

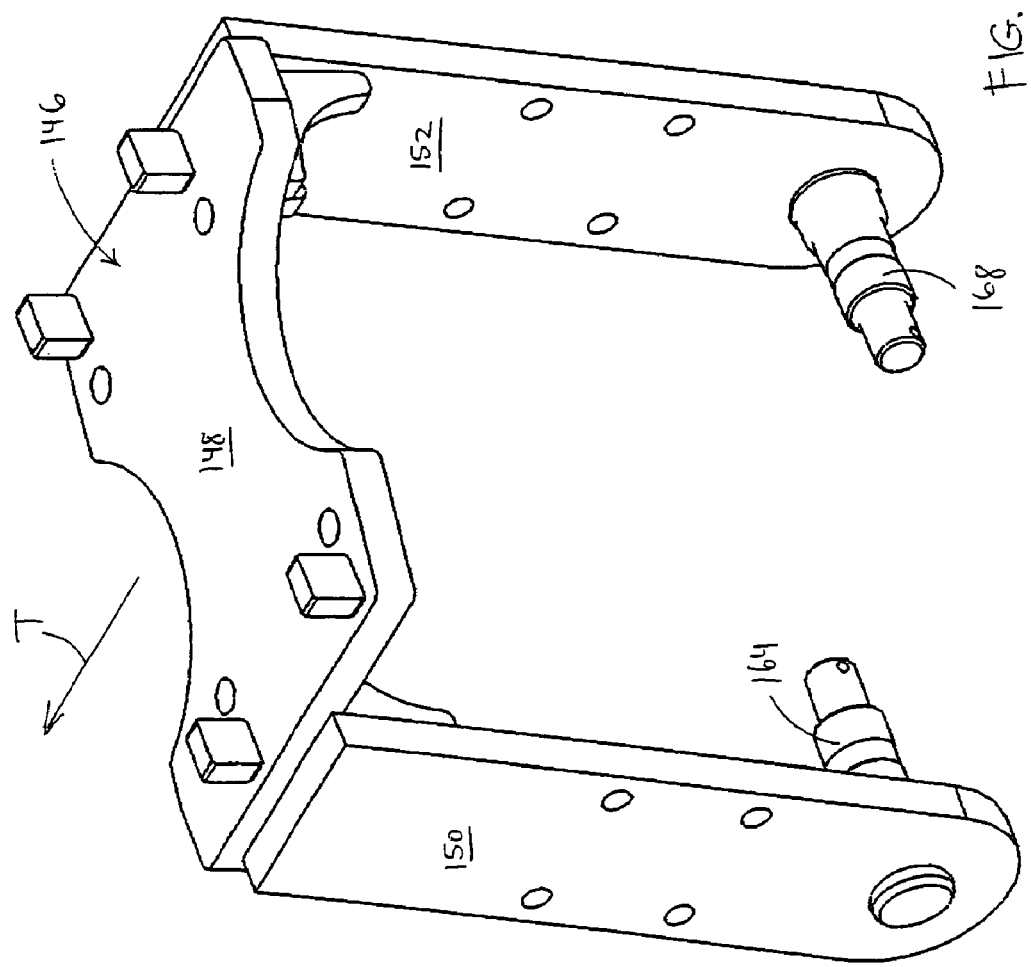

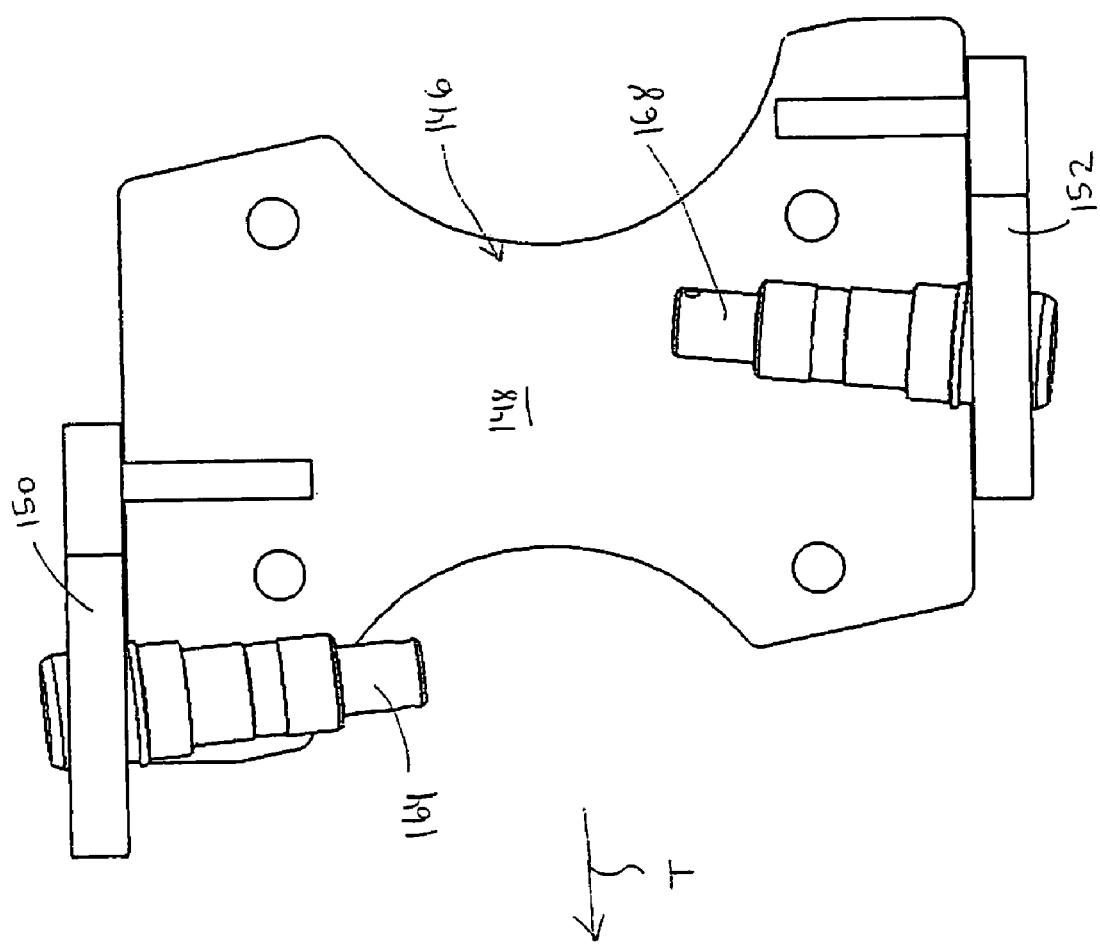

AGRICULTURAL SEEDER IMPLEMENT

BACKGROUND

Agricultural implements for opening furrows in the ground and depositing seed therein are well known. One such agricultural apparatus is disclosed in U.S. Pat. No. 7,216,596 B2, which is incorporated by reference herein. Such implements can form a plurality of furrows extending longitudinally along the direction of travel of the implement over the ground. Each furrow is formed by a disk drill that is rotatably mounted on the implement and cuts into the ground as the implement passes through the field. The disk drill may be disposed at an angle relative to the direction of travel, and also may be disposed at an angle relative to a direction normal to the ground over which it traverses (e.g., vertical, relative to a horizontally flat field). On one such implement design, such disk drills are arranged in pairs laterally across the implement and have one soil packing wheel disposed behind each pair of disks. In such a pair of these disks, the disks have the same diameter and are disposed in a mirror-image orientation, side-by-side relative to one another.

In the twin disk drill designs such as illustrated in U.S. Pat. No. 7,216,596, the disks are paired laterally across the implement, with the two disks of each pair being mounted in mirror image relation to one another. The two paired disks are directly opposed and squeeze soil and residue together as they rotate and pass through the ground. In certain soil types and moisture conditions, soil and residue will be held between the disks as they rotate and then released so that the soil and residue are deposited in front of the disks. This results in a non-uniform seed row with uneven depths of seed placement.

BRIEF SUMMARY

In one aspect, a seeder implement has a longitudinal direction of travel on a ground surface and comprises a fork comprising a first spindle support arm that supports a first spindle and a second spindle support arm that supports a second spindle. A first disk drill is supported on the first spindle, wherein the first spindle is oriented in a first orientation and at a first acute angle relative to a lateral line perpendicular to the longitudinal direction of travel. The first disk drill is oriented at a second acute angle relative to the ground surface. A second disk drill is supported on the second spindle, wherein the second spindle is oriented in a second orientation and at a third acute angle relative to the lateral line. The second disk drill is oriented at a fourth acute angle relative to the ground surface. The first disk drill is longitudinally offset ahead of the second disk drill, and there are no structural components between the first and second disk drills other than the first and second spindles.

In another aspect, a seeder implement having a longitudinal direction of travel on a ground surface comprises a fork comprising a first spindle support arm and a second spindle support arm. The first spindle support arm supports a first spindle and the second spindle support arm supports a second spindle. A first disk drill is supported on the first spindle, wherein the first spindle is oriented in a first orientation relative to the longitudinal direction of travel. A second disk drill is supported on the second spindle, wherein the second spindle is oriented in a second orientation opposite the first orientation relative to the longitudinal direction of travel. A seed packing wheel is longitudinally displaced from the first and second disk drills, and the seed packing wheel is mounted on an axle oriented in the first orientation. The first disk drill creates a first furrow and the second disk drill creates a second furrow in the ground surface. The packing wheel travels over both the first and second furrows as the implement travels in the longitudinal direction.

In yet another aspect, a seeder implement having a longitudinal direction of travel on a ground surface and a center longitudinal line comprises a first fork positioned on a first side of the center longitudinal line. The first fork comprises a first spindle support arm that supports a first spindle and a second spindle support arm that supports a second spindle. A first disk drill is supported on the first spindle, and the first spindle is oriented in a first orientation relative to the longitudinal direction of travel. A second disk drill is supported on the second spindle, and the second spindle is oriented in a second orientation opposite the first orientation relative to the longitudinal direction of travel. A first seed packing wheel is longitudinally displaced from the first and second disk drills, and the first seed packing wheel is mounted on an axle oriented in the first orientation. A second fork is positioned on a second side of the center longitudinal line. The second fork comprises a third spindle support arm that supports a third spindle and a fourth spindle support arm that supports a fourth spindle. A third disk drill is supported on the third spindle, wherein the third spindle is oriented in the second orientation. A fourth disk drill is supported on the fourth spindle, wherein the fourth spindle is oriented in the first orientation. A second seed packing wheel is longitudinally displaced from the third and fourth disk drills, and the second seed packing wheel is mounted on an axle oriented in the second orientation.

In still another aspect, a seeder implement having a longitudinal direction of travel on a ground surface comprises a fork comprising a first spindle support arm that supports a first spindle and a second spindle support arm that supports a second spindle. A first disk drill is supported on the first spindle, and the first spindle is oriented in a first orientation and at a first acute angle relative to a lateral line perpendicular to the longitudinal direction of travel. The first disk drill is oriented at a second acute angle relative to the ground surface. A second disk drill supported on the second spindle, and the second spindle is oriented in a second orientation and at a third acute angle relative to the lateral line perpendicular the longitudinal direction of travel. The second disk drill is oriented at a fourth acute angle relative to the ground surface. The first disk drill and the second disk drill have different diameters.

This Summary is provided to introduce a selection of concepts in a simplified form that are further described below in the Detailed Description. This Summary is not intended to identify key features or essential features of the claimed subject matter, is not intended to describe each disclosed embodiment or every implementation of the claimed subject matter, and is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure is referred to by like reference numerals throughout the several views.

FIG. 9 is a top schematic view of one pair of disk drills and their associated packing wheel, illustrating the longitudinal offset of the disks.

FIG. 17 is a schematic top view of one pair of disk drills and their associated packing wheel from one of the disk gang units 141b of FIG. 11, illustrating the longitudinal offset of the disks.

FIG. 18 is a rear perspective view of a fork for supporting an offset pair of disks, such as illustrated in FIG. 16.

FIG. 19 is a bottom view of the fork of FIG. 18, illustrating the offset of the opposed spindles for the pair of offset disks such as illustrated in FIG. 17.

Figure 1:
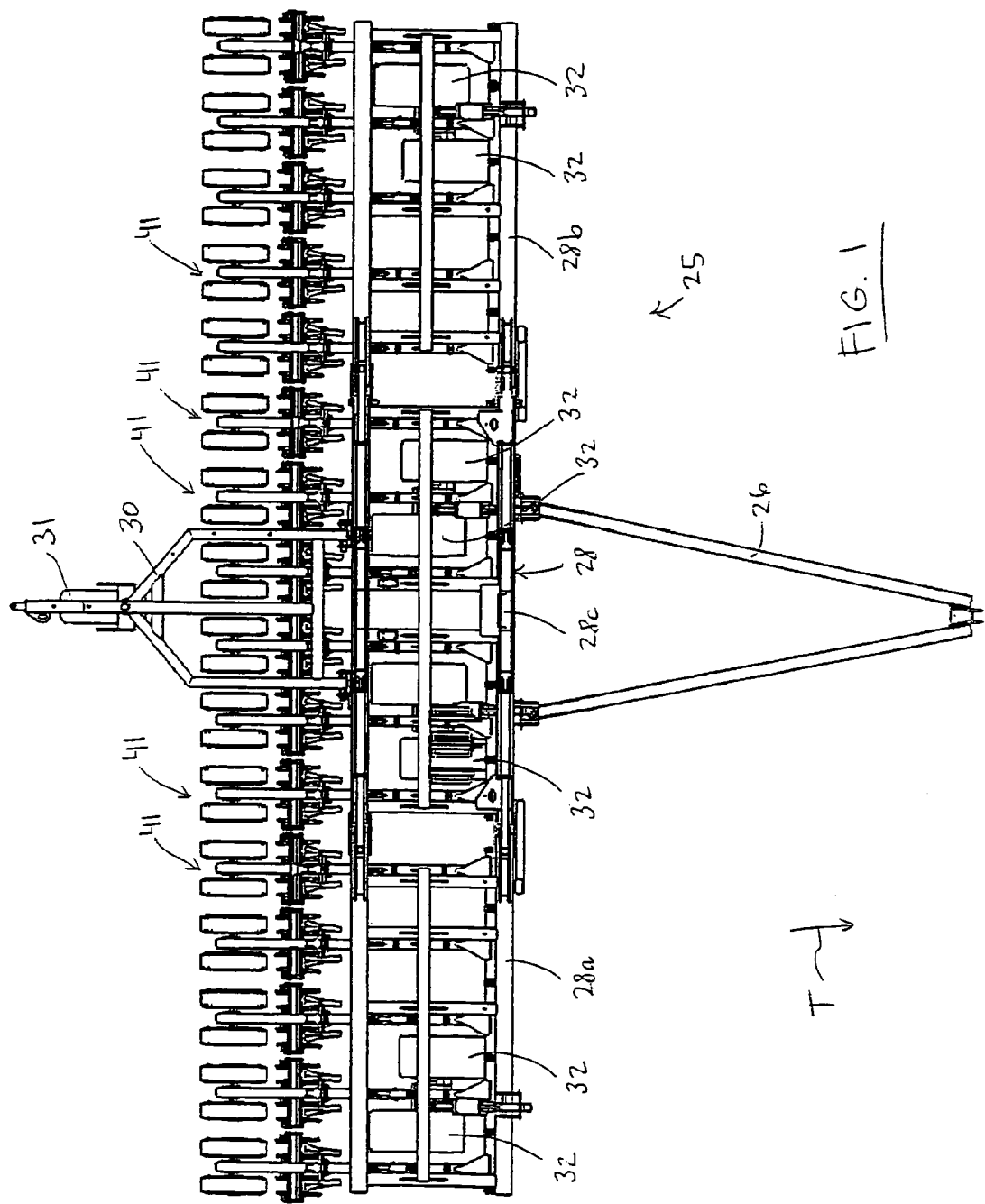
FIG. 1 is a top plan view of an agricultural seeder implement.
Figure 2:
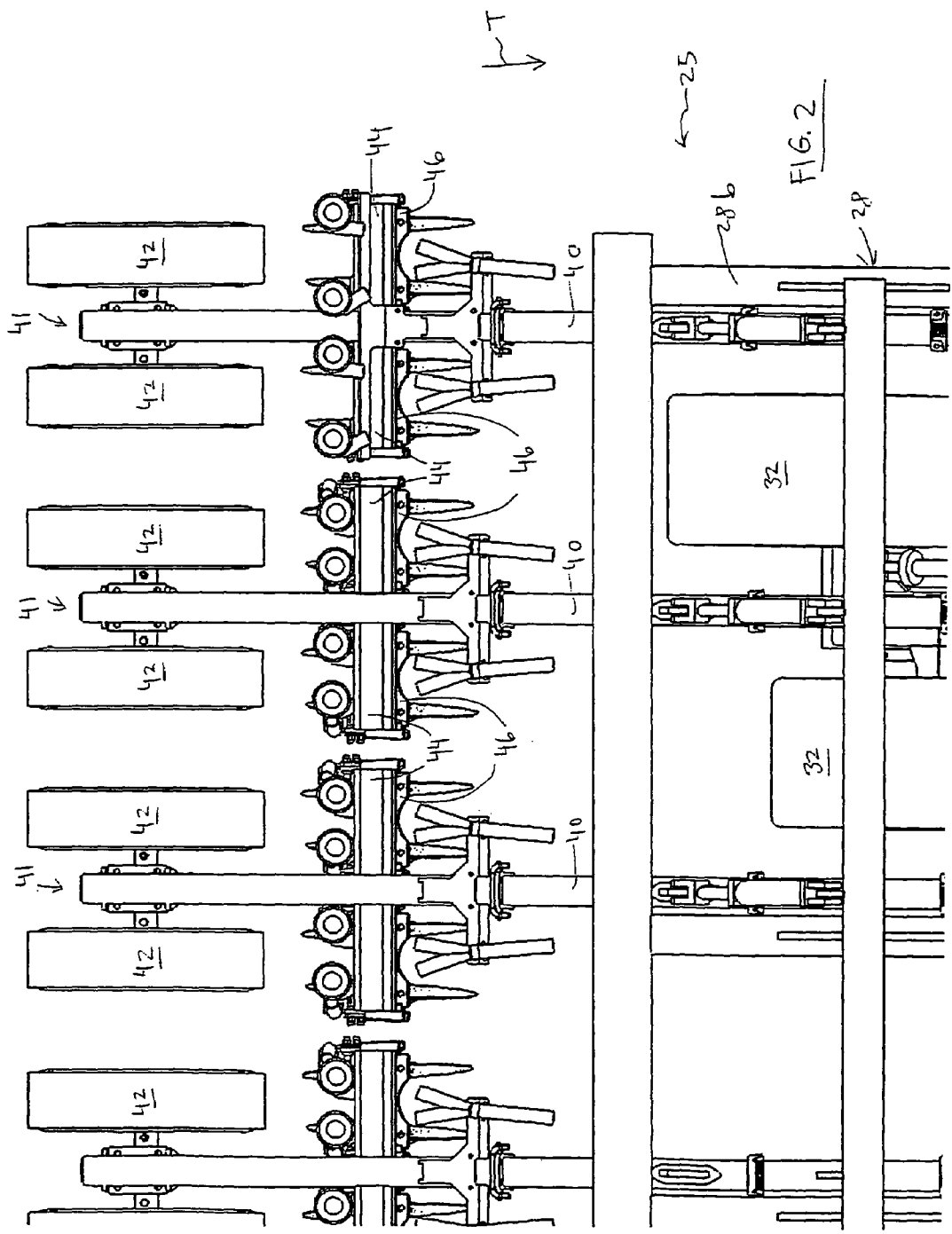
FIG. 2 is an enlarged view of a portion of FIG. 1.
Figure 3:
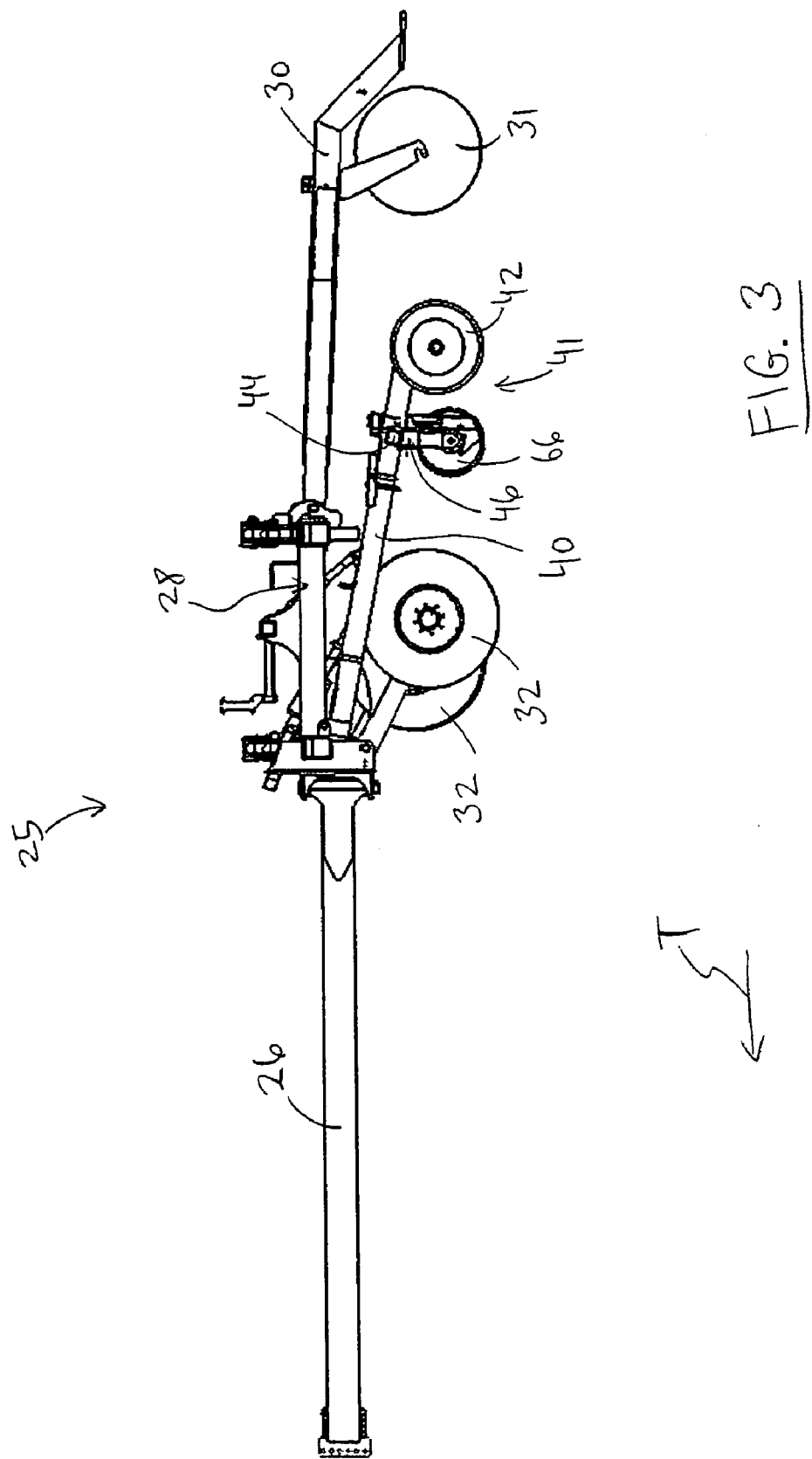
FIG. 3 is a side elevational view of the implement of FIG. 1, as taken from the right side thereof from the perspective of a viewer positioned forward of the implement with respect to the direction of implement movement.
Figure 4:
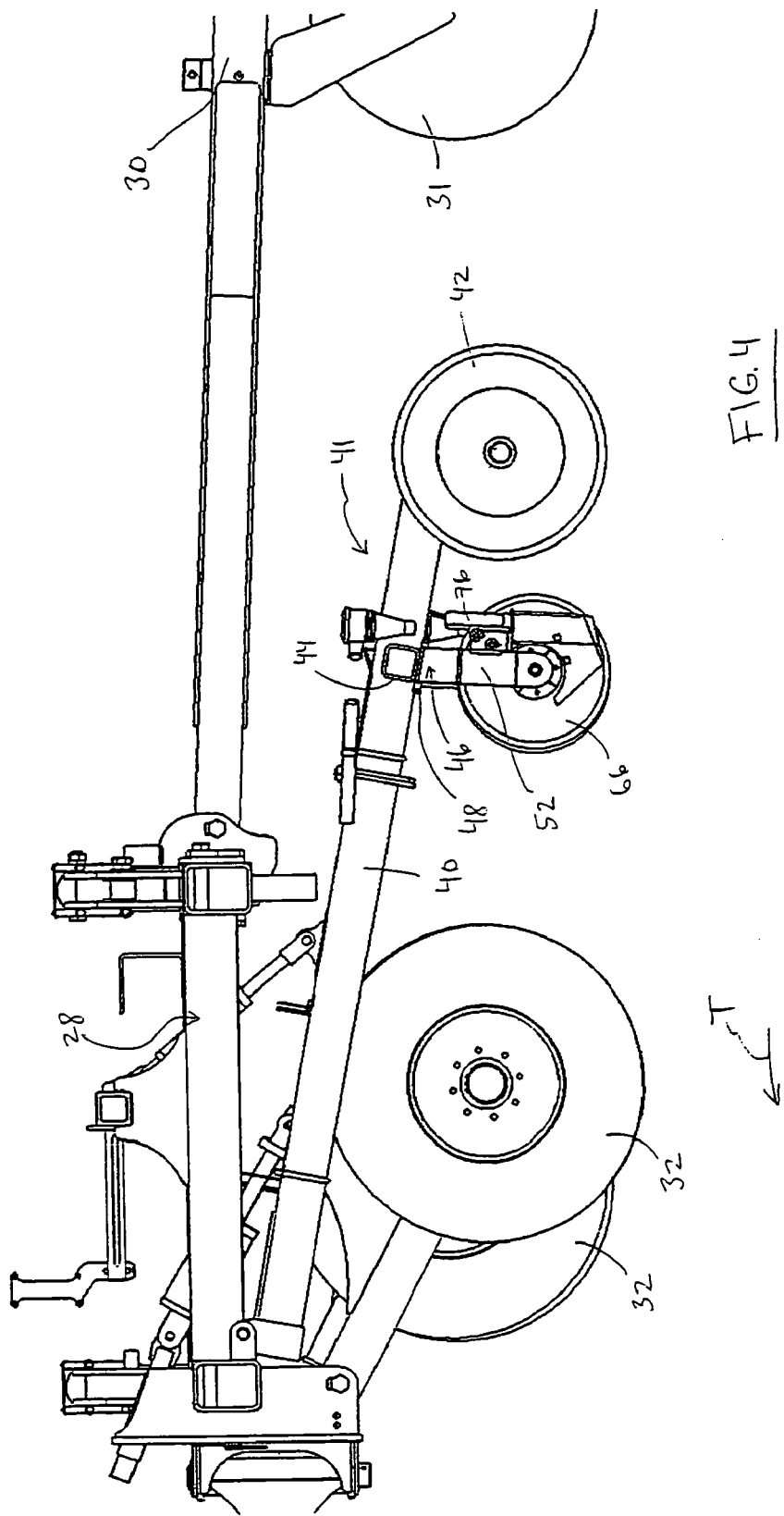
FIG. 4 is an enlarged view of a portion of FIG. 3.

While the above-identified figures set forth one or more embodiments of the disclosed subject matter, other embodiments are also contemplated, as noted in this disclosure. In all cases, this disclosure presents the disclosed subject matter by way of representation and not limitation. It should be understood that numerous other modifications and embodiments can be devised by those skilled in the art which fall within the scope and spirit of the principles of this disclosure.

DETAILED DESCRIPTION

In an exemplary twin disk drill seeder implement, offsetting the disks relative to the longitudinal orientation of the implement mitigates the problem of soil and residue pickup by the disks. The soil is no longer carried around a disk; rather, it is released from the disks as it is lifted between the disks. This results in a uniform seed row and seeding depth.

Instead of aligning the disks in a mirror image relationship laterally across the implement, the disks of each pair are offset in the implement's longitudinal orientation. The two paired disks are held on a common fork arranged so that the disks displace soil towards each other as they are drawn across the ground. The disks are offset from 0.25 to 8 inches, relative to one another, in the longitudinal direction. In other words, the trailing edge of one disk is farther behind the trailing edge of the other disk, by 0.25 to 8 inches. The disks rotate during engagement with the ground as the implement moves over the ground, and each disk displaces soil towards the other disk, creating a squeezing and lifting action of the soil. As noted above, when the disks are in a mirror image configuration, such action can carry the soil around so that it is deposited in front of the disks. When the edges of the disks are longitudinally offset, the soil is not carried around to the front of the disk, thereby resulting in more uniform seeding depth and soil displacement behind the disks.

By offsetting the disks longitudinally, the soil is released before it can be carried around with the disks. This results in uniform placement of the dirt disturbed by the disk and the ultimate benefit is uniform seed placement and consistent soil cover of the seed. For instance, the disks, because of the offset, work against each other enough so that the soil is released and falls back to the ground before it is carried around to the front of one or both of the disks. Aligning the two disks of equal diameters (e.g., 18 inches) in an asymmetrical manner disturbs the possible lifting action of the soil by each disk. It is contemplated that the same effect can also be achieved using different diameter disks, where the axes of those disks are offset in the vertical plane to allow them to run at the same ground penetration depth (e.g., a 17 inch disk and a 18 inch disk paired together, but mounted to run at the same depth of soil penetration). Because longitudinally offsetting the disks results in less soil being carried by the disks, the arrangement prevents a situation in which soil builds up to the point where the disks lock up and must be periodically cleaned. Moreover, the elimination of soil build-up enables implement 25 to be used at higher driving speeds; a typical speed is between about 5 and 10 miles per hour, but may be about 15 miles per hour. Both of these considerations result in increased productivity. Reducing the soil load carried by implement 25 also results in reduced fuel usage. Moreover, because the effective load is reduced, implement 25 may be configured to pull additional disk (or larger) gang units 41 without requiring a larger tractor, thereby allowing for a wider path of ground to be seeded in a single pass.

FIGS. 1-4 illustrate an agricultural seeder implement 25 where the implement has a draw bar 26 for attachment to a vehicle for pulling the implement across the ground (e.g., a tractor—not shown) in a direction of implement travel T. The draw bar is connected to an implement frame 28, which may have one or more frame sections, such as side folding frame sections 28a and 28b and central frame section 28c. A trailing draw bar 30 is attached to the frame 28, and provides the means for connecting an air seeder (not shown) to the implement 25. As shown, the trailing draw bar 30 may have a support wheel 31. Frame 28 is supported on the ground by a plurality of support wheels 32. A plurality of longitudinal disk gang units 41 are connected to the frame 28 of the implement 25. Each gang unit 41 has a longitudinal bar 40 that is pivotally connected, adjacent its forward end, to the frame 28. The bar 40 is supported, adjacent its rearward end, by one or more seed packing wheels 42.

Figure 5:
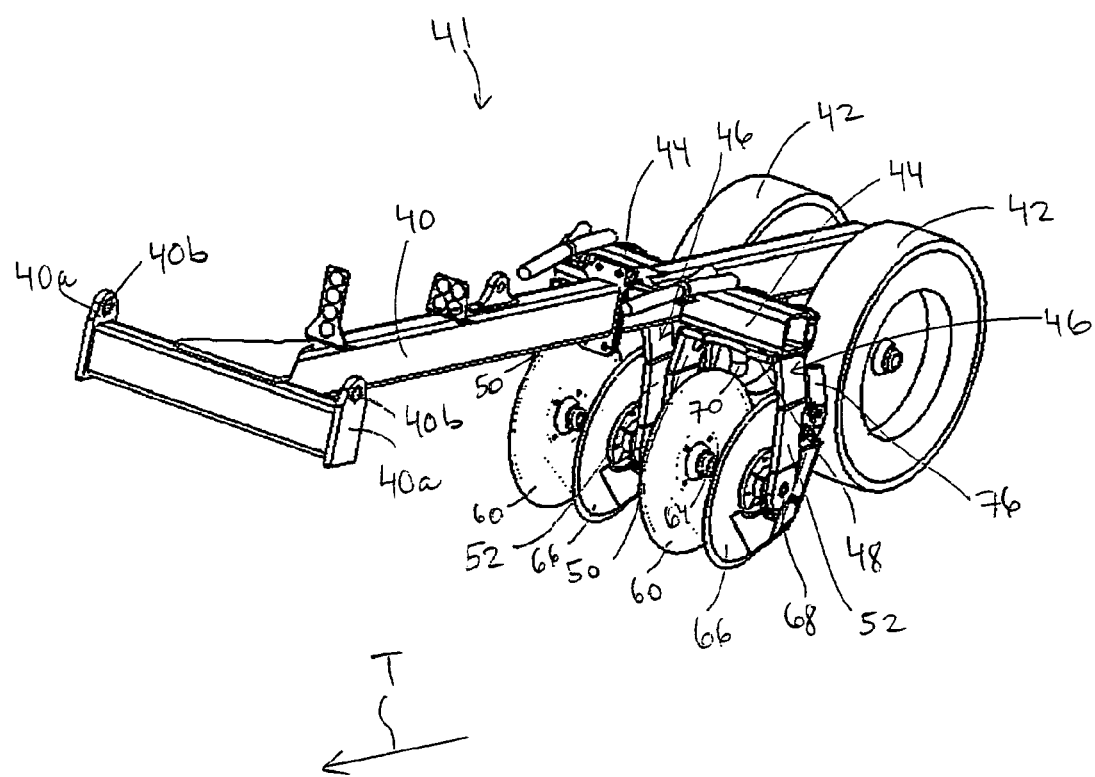
FIG. 5 is a perspective view of one disk gang unit, bearing two pairs of opposed disk drills and a packer wheel for each pair of disks.

FIG. 5 illustrates one disk gang unit 41 in isolation from the entire implement assembly 25. As noted above, the longitudinal bar 40 has frame connection structure (such as pivot ears 40a and associated lateral apertures 40b—FIG. 5) that is attached to the frame 28 and allows pivoting of the unit 41 relative thereto. A pair of laterally extending arms 44 are fixed to the bar 40, longitudinally ahead of the packing wheels 42. Each arm 44 extends perpendicularly relative to its respective bar 40. A fork 46 is affixed to each arm 44 and depends downwardly therefrom, longitudinally ahead of one of the wheels 42. Each fork 46 has a laterally extending central top portion 48, and vertically extending spindle support arms 50 and 52. The spindle support arms 50 and 52 extend downwardly from each end of the central portion 48.

A disk drill 60 is rotatably supported on a shaft or spindle 64 supported by a lower end of the arm 50, and a disk drill 66 is rotatably supported on a shaft or spindle 68 supported by a lower end of the arm 52. Each disk is thus supported from the outside relative to its opposed disk, and there is no disk support structure disposed or depending therebetween, other than the spindle structures 64, 68 (see, e.g., FIGS. 5, 6 and 7).

Each disk 60, 66 is aligned to engage the top of the ground as the implement moves across the field, and dig a furrow therein. A seed drop tube is provided adjacent the rearward portion of each disk 60, 66 to allow seeds to be dropped into the furrow created by the disk 60, 66. A seed drop tube 70 is provided for disk 60, and a seed drop tube 76 is provided for disk 66. The seed drop tubes 70 and 76 are provided with seeds via an air feeder through a series of tubes and manifolds carried on the implement 25, as is known. In FIGS. 1-5, portions of those tubes and manifolds are shown and portions are broken away for clarity of illustration. After the seed is deposited in the furrow, the soil is then pushed over the deposited seed by the seed packing wheel 42 to press the soil firmly around the sown seeds to improve germination. Because the seed packing wheel 42 covers the seed with the soil and rolls over the covered furrow to smooth the soil surface, a single seed packing wheel 42 accomplishes the functions conventionally achieved by two wheels: a cover wheel and a tamping wheel. The use of a single wheel rather than two simplifies and streamlines the required maintenance because there are fewer moving parts. Moreover use of a single seed packing wheel 42 for each disk drill prevents sidewall compaction, wherein the sidewall of a seed furrow consists of more densely compacted soil. Such sidewall compaction is undesirable from an agronomic standpoint because it can hinder seed germination.

Figure 6:
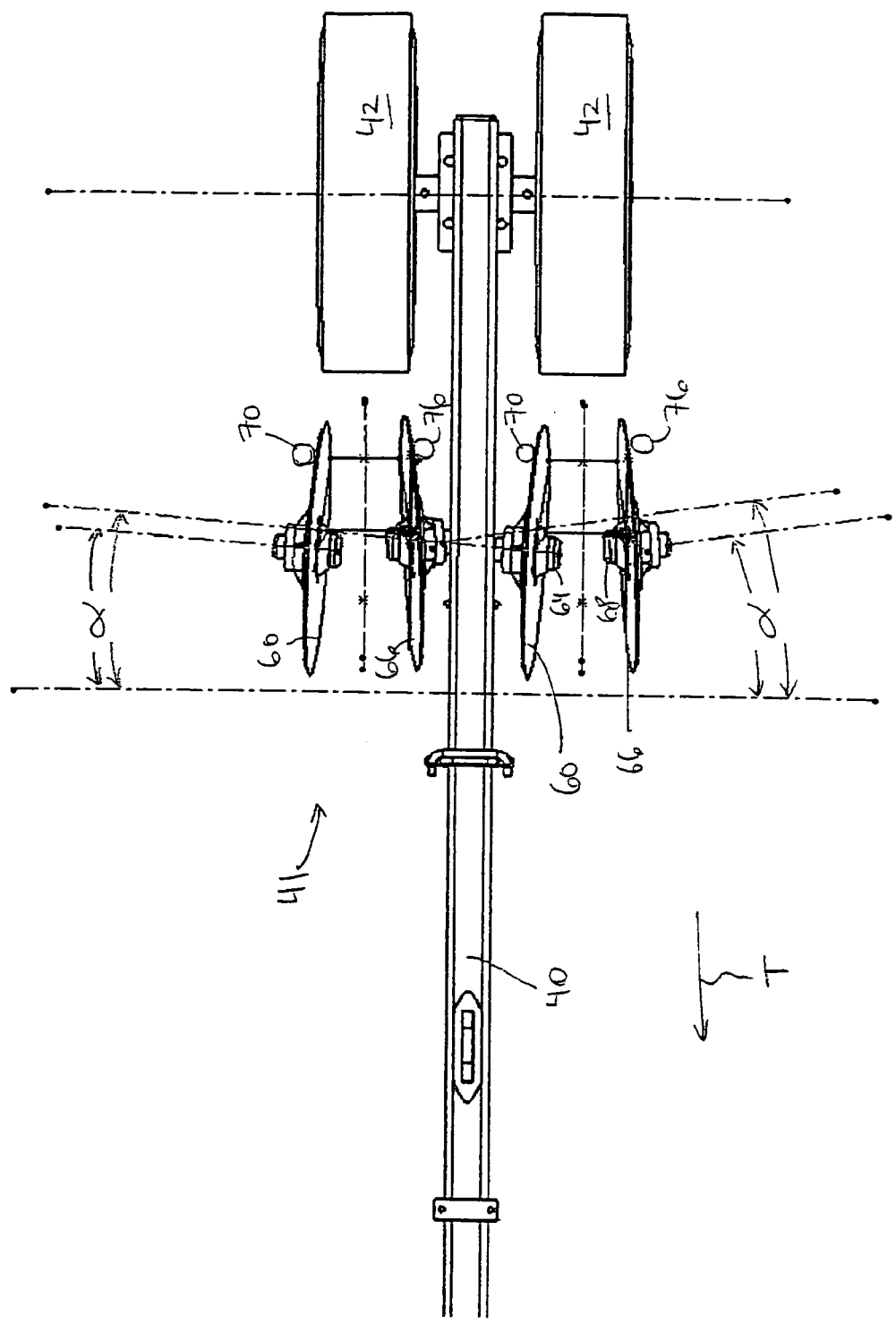
FIG. 6 is a schematic top view of one of the disk gang units.
Figure 7:
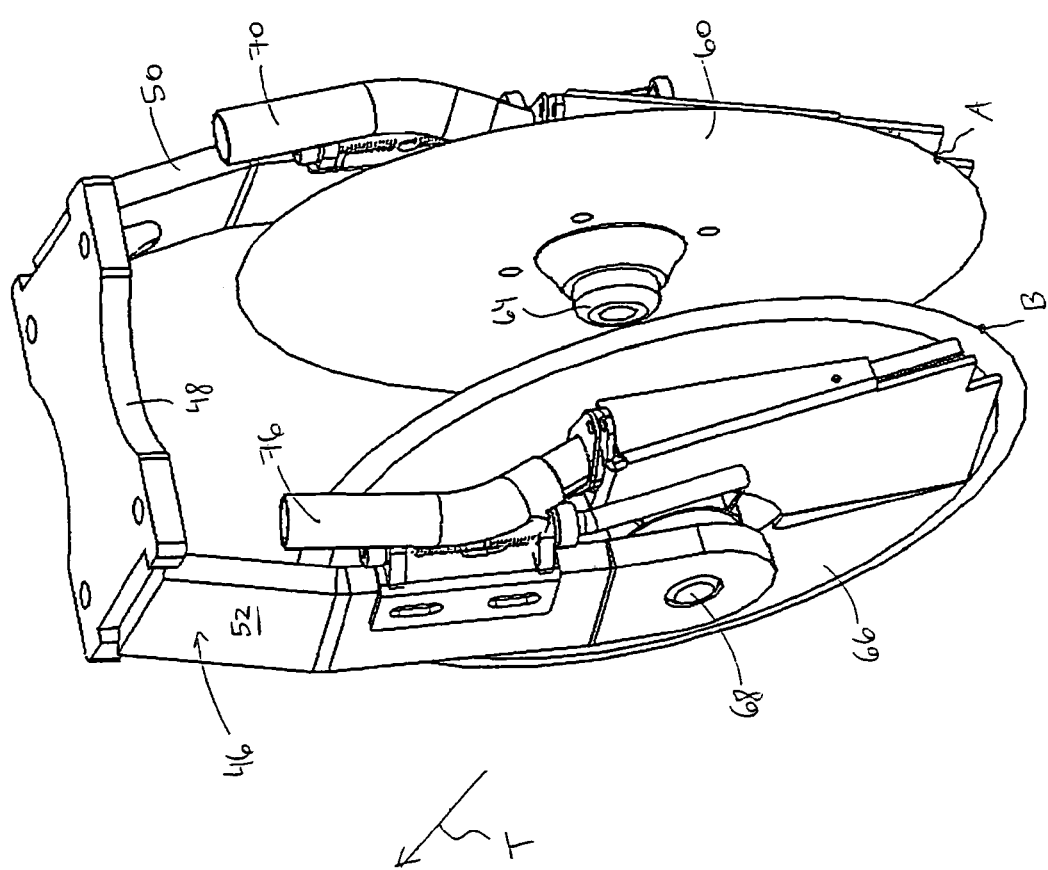
FIG. 7 is a perspective rear view of one pair of disk drills and their associated mounting fork.

The spindle 64, 68 for each disk 60, 66 is tilted so that the disk itself is tilted relative to the surface of the ground. In other words, the spindle 64, 68 is not literally horizontal, but tilted relative to the surface of the ground over which it extends, thus tilting the disk 60, 66 mounted thereon as well. The disks 60 and 66 are tilted so that their bottom rear edges are closest to one another, such as illustrated by points A and B in FIG. 7. In an exemplary embodiment, the vertical tilt of each disk 60, 66 is at an acute angle, such as about 10 degrees, from a true vertical line relative to the ground surface upon which implement 25 travels. The spindle 64, 68 of each disk 60, 66 is also disposed at an acute angle relative to a line extending laterally from the longitudinal bar 40, which is aligned in the direction of implement travel. In an exemplary embodiment, both spindles 64, 68 are disposed at the same angle. As seen in FIG. 6, each spindle 64, 68 is disposed at an angle α relative to a lateral line extending from the bar 40. In one embodiment, the angle α is approximately 2-3 degrees. In one specific embodiment, the angle α is approximately 2.87 degrees. The angle α illustrated in FIG. 6 corresponds in general to the angle X in FIG. 1 of U.S. Pat. No. 7,216,596, for orientation purposes.

The disks 60, 66 of a single disk gang unit 41 are oriented in opposite orientations. That is, with respect to the direction of implement travel T, the front edge of the disk on the right tilts outward to the right, and the front edge of the disk on the left tilts outward to the left, such that the rear edges of the disks 60, 66 converge toward each other. With this arrangement of converging disks 60, 66, little soil is thrown around during the cutting of the furrows. Moreover, any soil that is thrown up during the formation of the furrows in the ground is thrown by each disk 60, 66 toward the central path of seed packing wheel 42 rather than outwardly away from the outer surfaces of the disks 60, 66. This is particularly advantageous as the soil surface ends up reasonably flat and the seeds may be placed accurately in the desired locations in the soil.

Figure 10:
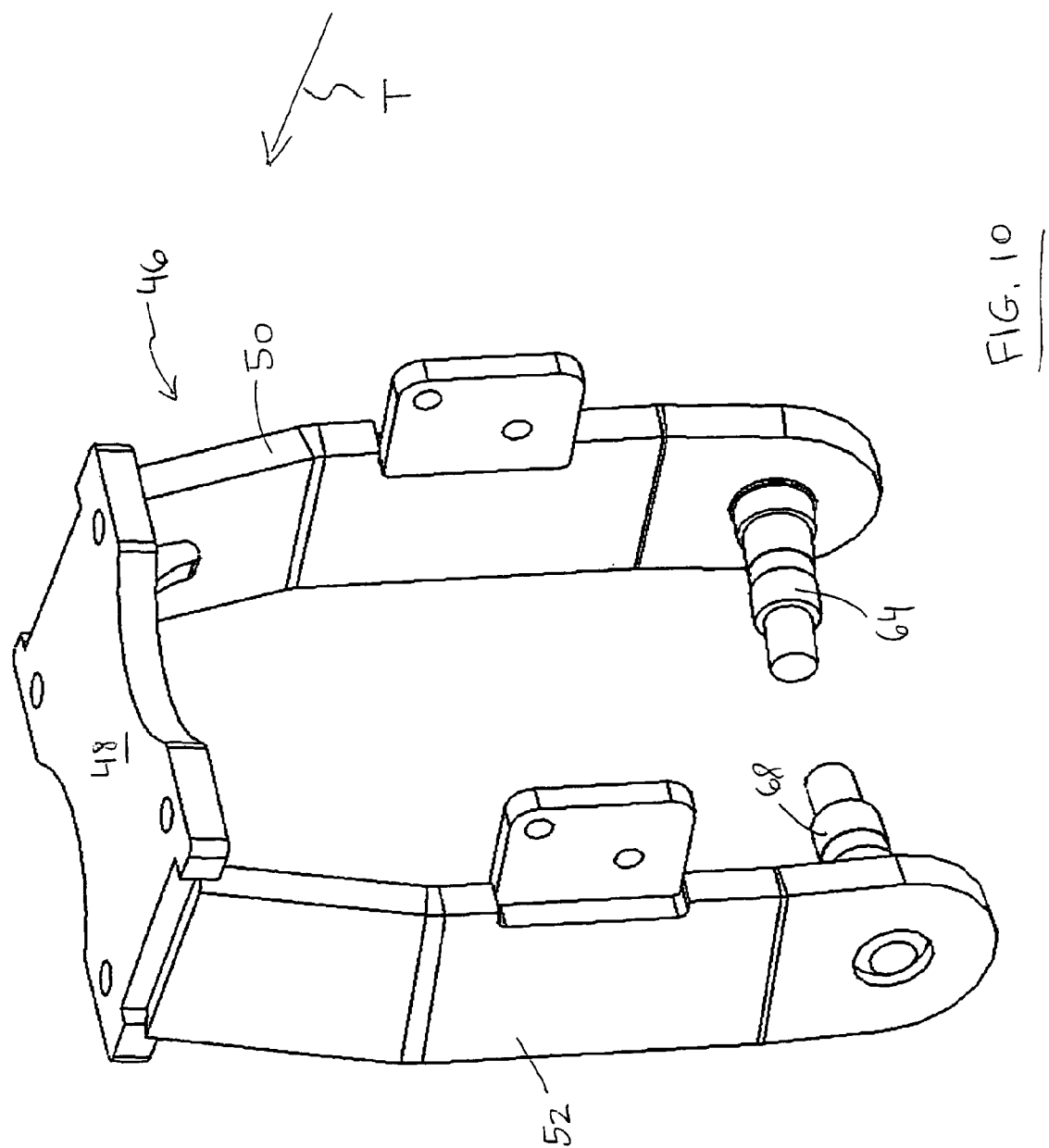
FIG. 10 is a front perspective view of a fork for supporting an offset pair of disks, such as illustrated in FIG. 9.

As noted above, the disks 60 and 66 of each pair are staggered longitudinally relative to one another. This arrangement is illustrated schematically in FIG. 9, wherein the stagger of the leading and trailing edges of the disks 60 and 66 are illustrated by longitudinal staggered distances S. In one embodiment, the staggered distance S may range from 0.25 to 2 inches. The staggering of equal diameter disks may be achieved by configuring the fork 46 as illustrated in FIG. 10. As can be seen, the arms 50 and 52 are laterally spaced apart and opposed, but are likewise staggered longitudinally when mounted to the central portion 48. In one design embodiment, measured at a point taken at the center of each spindle 64, 68 of the arms 50, 52, respectively, the longitudinal offset range between the location of those points can be from 0.25 to 1 inch or, as noted herein, from 0.25 to 2 inches to achieve the desired offset disk effect.

An alternative arrangement for achieving staggered leading and trailing edges of the opposed paired disks would be to employ different diameter disks. In order for each disk to penetrate the ground the same distance for planting, the spindle support arm on the fork for the smaller sized disk must have its spindle lower than the other spindle support arm, but the spindles could then be aligned laterally.

As noted above, when the soil is sticky, the offset of the disks reduces the transfer of soil from the rear of the rotating disk around to the front thereof as it moves across the field. The paired disks are arranged to turn the soil and cause the soil plowed from each furrow to collide between the two offset disks and settle into a single longitudinally extending soil pile, which then is packed and leveled out (over the seeds just deposited in the adjacent furrows) by the packing wheel. Each disk causes the dirt to turn over and smack into the dirt being turned over by the other disk in a pair of disks, and then the packing wheel presses the dirt back down over the seed that has just been deposited behind each disk.

When the disks are of different diameters, they may also rotate at different rates as they travel through the field, which may further minimize the chance that dirt is carried by the collective force of the rotating disks from the rear of the disks to the front of the disks. In either alternative embodiment, the soil is not uniformly pinched and lifted by the disks, either because two equal diameter disks are offset, or because the disks are of different diameters (whether or not they are offset).

Figure 11:
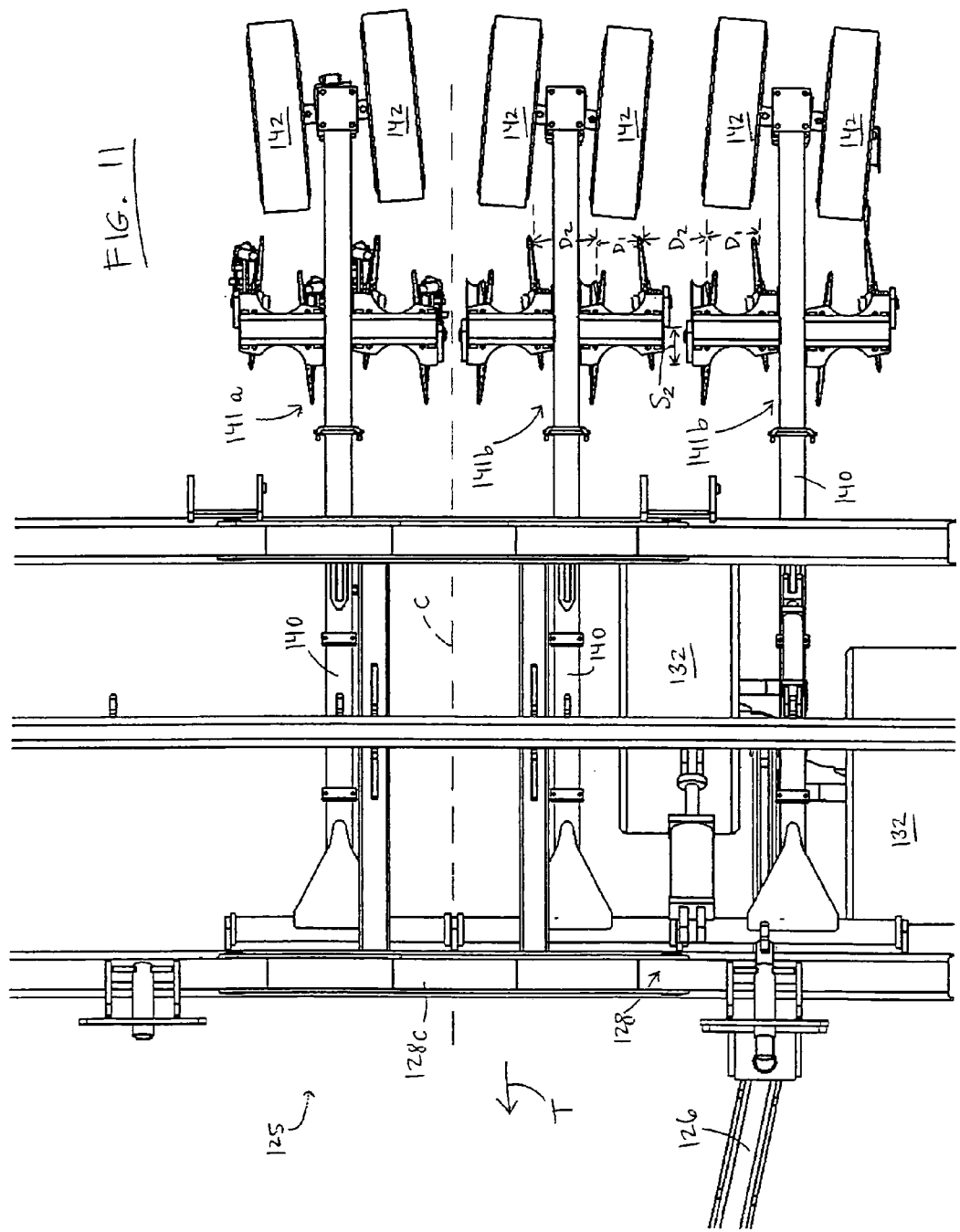
FIG. 11 is an enlarged top plan view of a central portion of an agricultural seeder implement like that of FIG. 1, provided with an alternative embodiment of the disk gang units of the implement, with each disk gang unit 141a or 141b bearing two pairs of opposed disk drills and a skewed packing wheel for each pair of disks.

An alternative embodiment of the disclosed implement is illustrated in FIGS. 11-19. In this exemplary arrangement, an agricultural seeder implement 125 (with seed delivery lines not shown in most figures, for clarity of illustration) is also disclosed to be attached to a vehicle for pulling the implement 125 across the ground. In FIG. 11 a portion of a draw bar 126 for attachment to such a vehicle (e.g., a tractor) is illustrated. The draw bar 126 is connected to an implement frame 128 which may have one or more frame sections (such as the side frame section 28a and 28b and central frame section 28c illustrated in FIG. 1). FIG. 11 shows a portion of a central frame section 128c of the implement frame 128. The implement 125 may also include a trailing draw bar (not shown) that provides means for connecting the implement 125 to an air seeder (not shown). Frame 128 is supported on the ground by a plurality of support wheels 132. A plurality of longitudinal disk gang units 141a and/or 141b are connected to the frame 128 of the implement 125. Each gang unit 141a or 141b has a longitudinal bar 140 that is pivotally connected, adjacent its forward end, to the frame 128. The bar 140 is supported, adjacent its rearward end, by one or more seed packing wheels 142.

Figure 12:
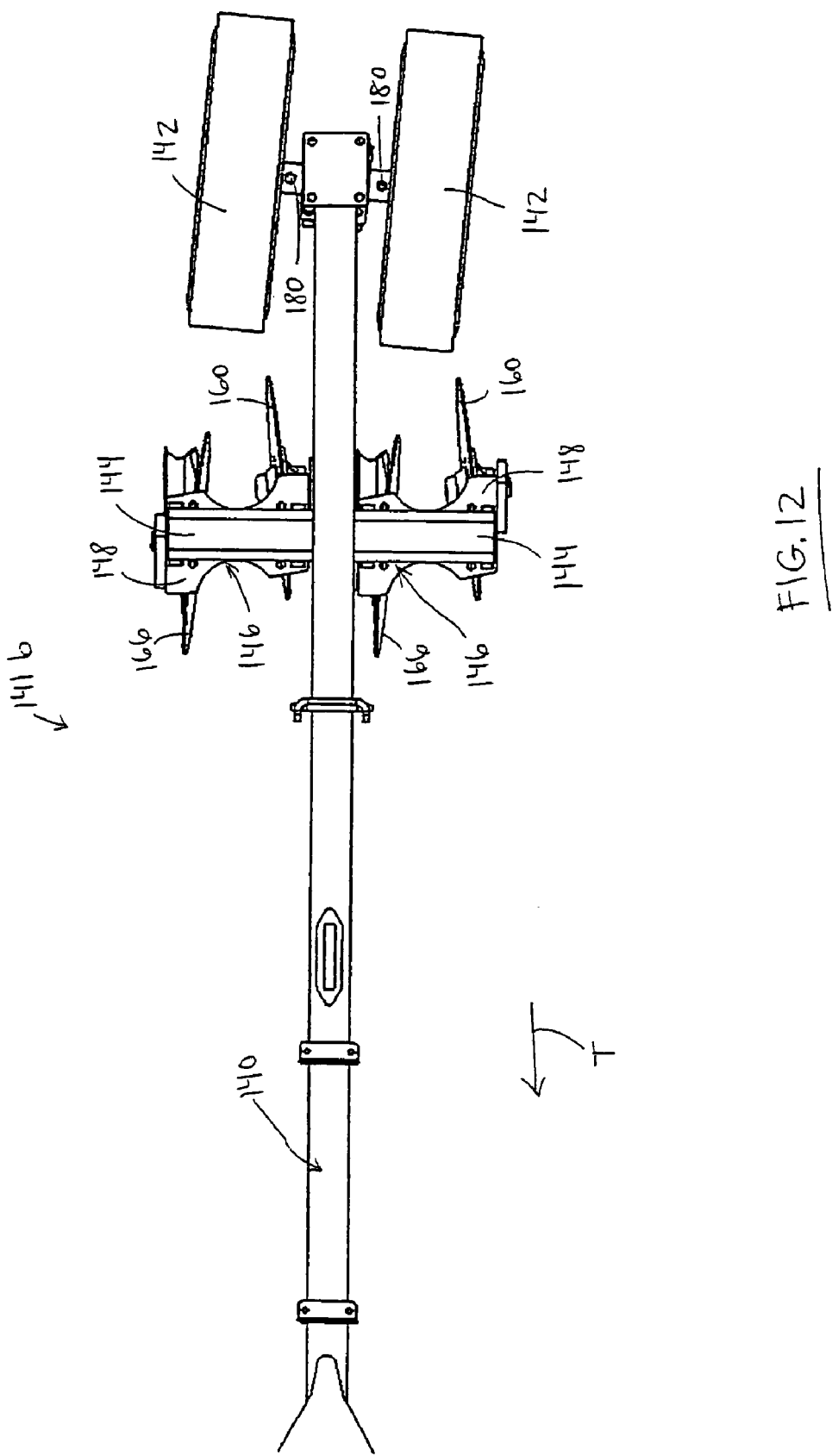
FIG. 12 is a top elevational view of one of the disk gang units 141b of FIG. 11.
Figure 13:
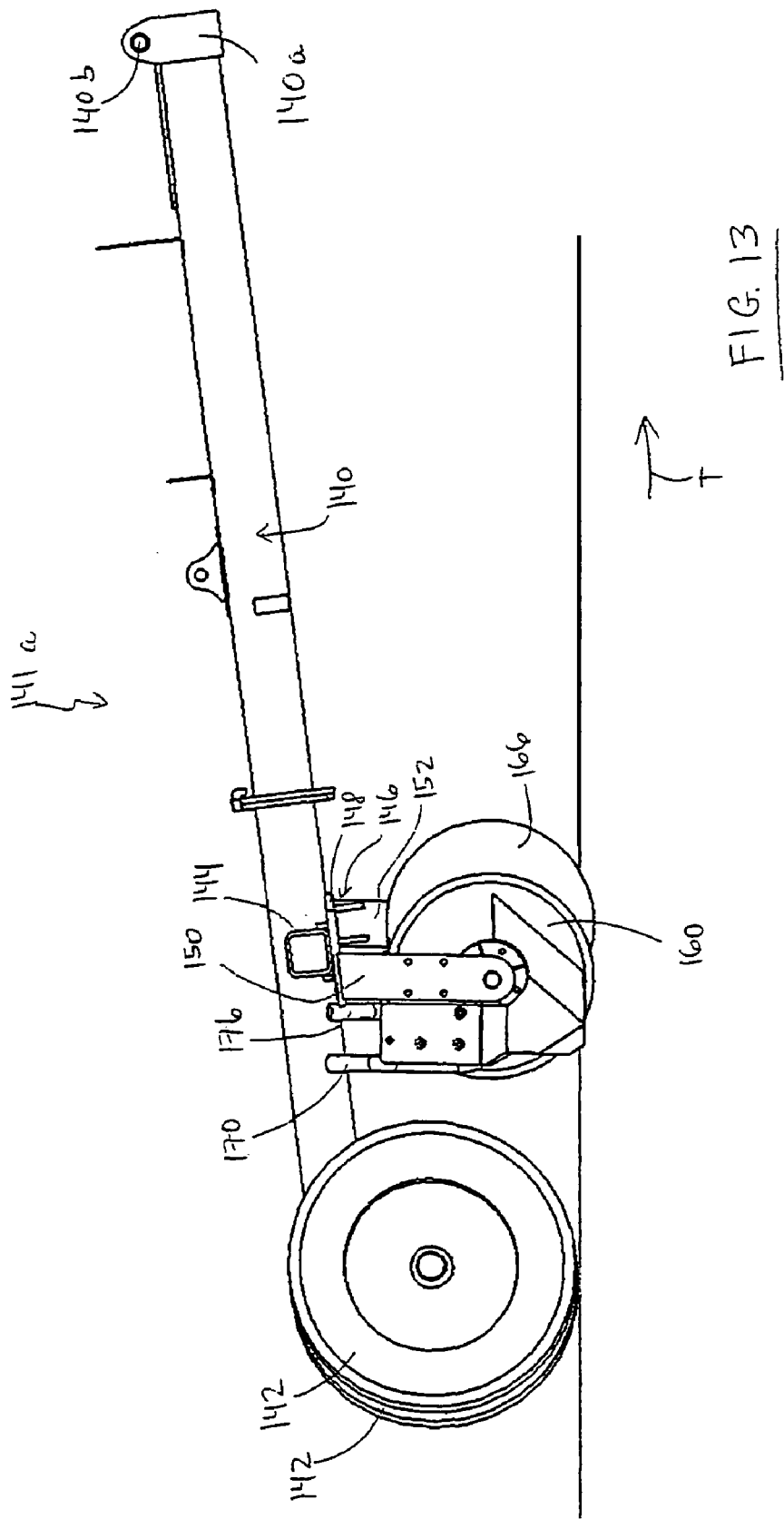
FIG. 13 is a side plan view of one or the disk gang units 141a of FIG. 11.

FIG. 12 illustrates one disk gang unit 141b in isolation from the entire implement assembly 125. As noted above, the longitudinal bar 140 of each unit has frame connection structure (such as pivot ears 140a and associated lateral apertures 140b—see FIG. 13, which illustrates one of the disk gang units 141a) that is attached to the frame 128 and allows pivoting of the units 141a or 141b relative thereto. A pair of laterally extending arms 144 are fixed to the bar 140 of each unit, longitudinally ahead of the packing wheels 142. Each arm 144 extends perpendicularly relative to its respective bar 140. A fork 146 is affixed to each arm 144 and depends downwardly therefrom, longitudinally ahead of one of the packing wheels 142 (see, e.g., FIG. 13). Each fork 146 has a laterally extending central top portion 148, and downwardly extending spindle support arms 150 and 152. The spindle support arms 150 and 152 extend downwardly from each end of the central top portion 148.

Figure 14:
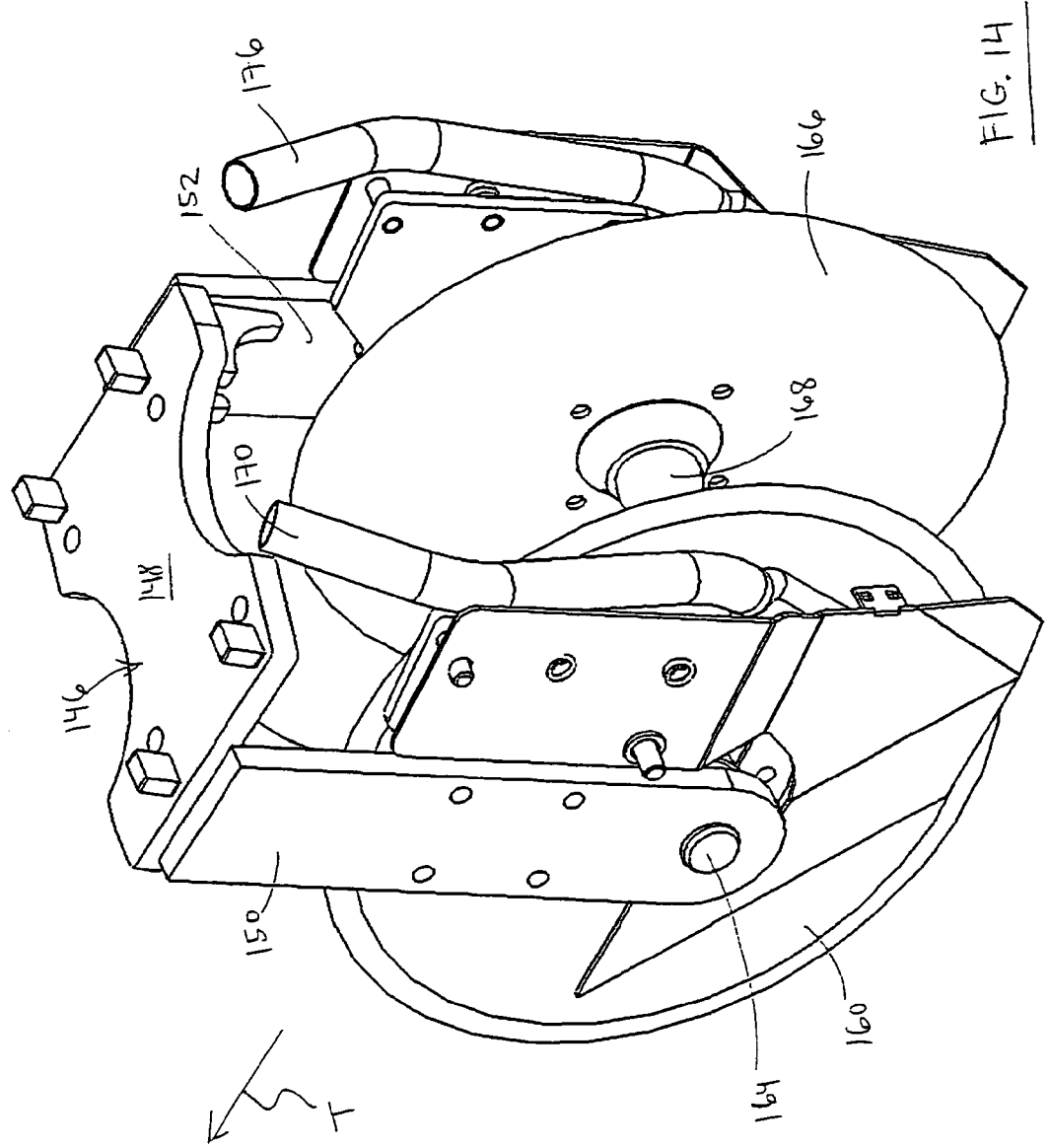
FIG. 14 is a perspective rear view of one pair of disk drills and their associated mounting fork, from one of the disk gang units 141a of FIG. 11.
Figure 15:
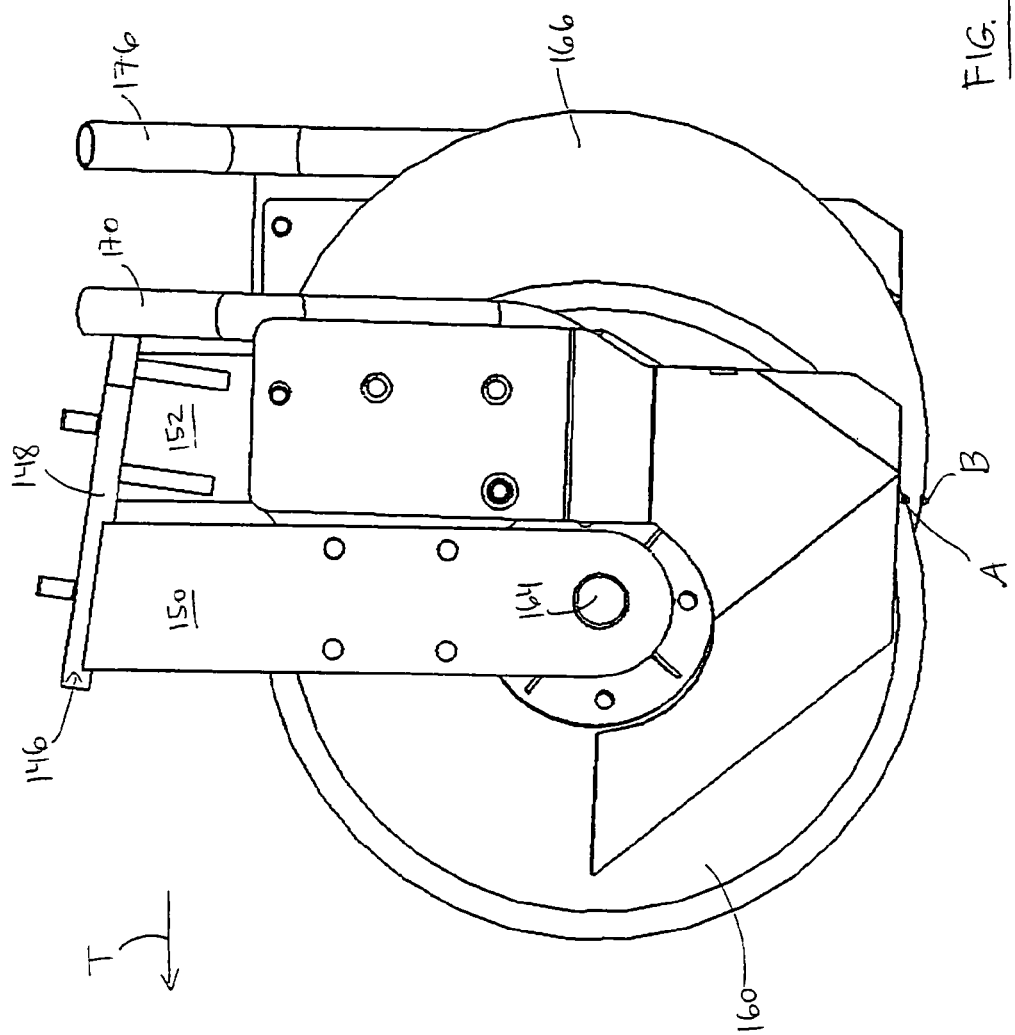
FIG. 15 is an enlarged side view of the assembly of FIG. 14, as taken from the left side thereof.

An exemplary opposed disk drill assembly from the disk gang unit 141a (FIG. 13) is shown in FIGS. 14 and 15. As seen in FIG. 14, a disk drill 160 is rotatably supported on a shaft or spindle 164 from adjacent a lower end of the arm 150, and a disk drill 166 is rotatably supported on a shaft or spindle 168 from adjacent a lower end of the arm 152. Each disk is thus supported from the outside relative to its opposed disk, and there is no disk support structure disposed or depending therebetween (see, e.g., FIGS. 12, 14 and 16). This keeps the area between opposed disks 160, 166 clear of implement structural features that might otherwise tend to collect soil or other field debris (e.g., corn stalks, wheat straw, etc.). Such debris collection between the disks 160, 166 might inhibit free rotation of the disks and adversely impact seed distribution efficiencies.

Figure 8:
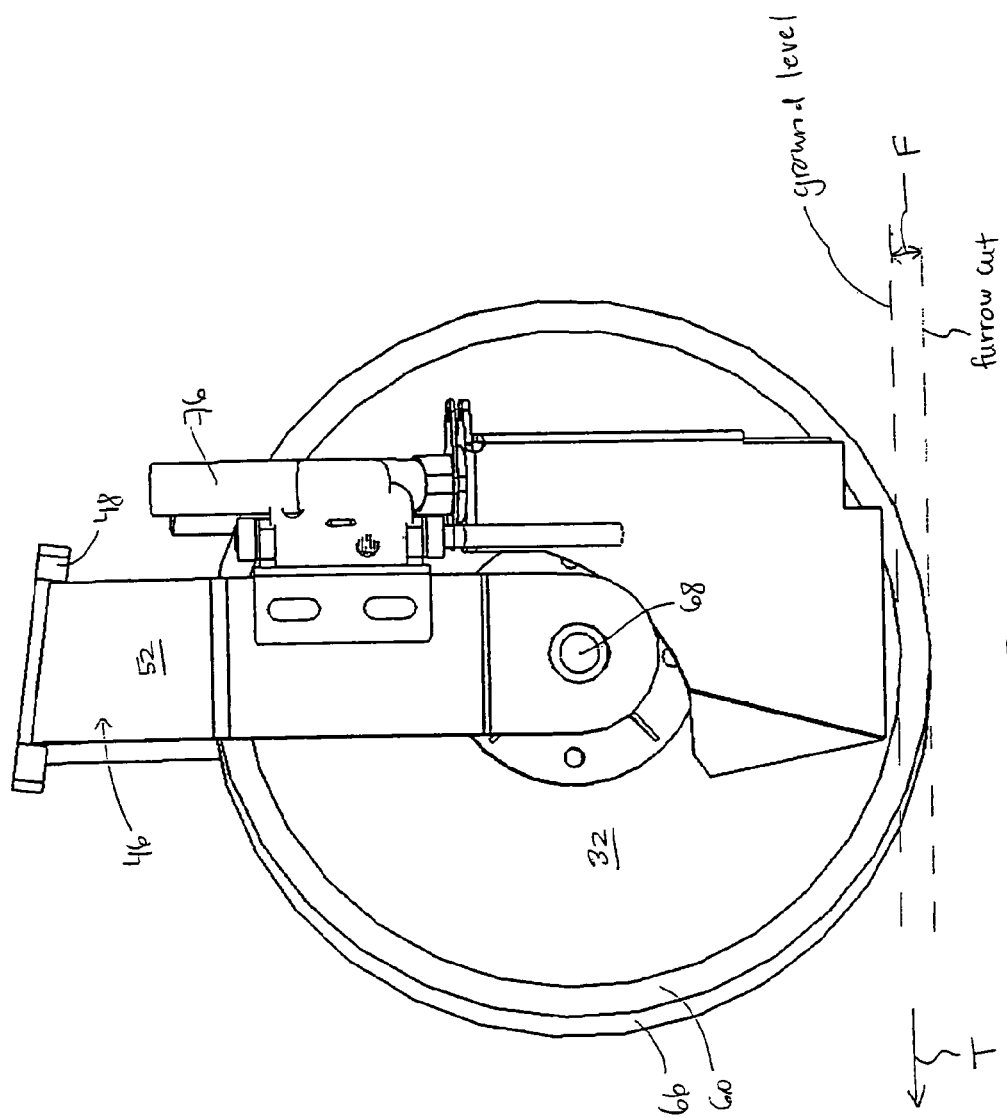
FIG. 8 is an enlarged side view of the assembly of FIG. 7, as taken from the left side thereof.

Each disk 160, 166 is aligned to engage the top of the ground as the implement moves across the field and dig a furrow therein of depth F, as shown in FIG. 8. In one embodiment, the disk 160, 166 depths are adjustable to dig furrows up to three inches deep. For some seeding applications, 1.5 inches may be the desired depth of disk penetration into the soil. A seed drop tube is provided adjacent the rearward portion of each disk 160, 166 to allow seeds to be dropped into the furrow created by the disk 160, 166. A seed drop tube 170 is provided for disk 160, and a seed drop tube 176 is provided for disk 166. The seed drop tubes 170 and 176 are provided with seeds by an air seeder through a series of tubes and manifolds carried on the implement 125, as is known.

The spindle 164, 168 for each disk 160, 166 is tilted and skewed so that the disk 160, 166 itself is tilted and skewed relative to the surface of the ground. In other words, the spindle 164, 168 is not literally vertical and horizontal, but is tilted relative to the surface of the ground over which it extends, thus tilting the disk 160, 166 mounted thereon as well. Moreover, the spindle 164, 168 is skewed relative to the longitudinal extent of the arm 140, thus skewing the disk 160, 166 mounted thereon as well. The disks 160 and 166 are mounted so that their bottom edges are closest to one another, such as illustrated by points A and B in FIG. 15. In one design embodiment, each disk 160, 166 of an opposed pair of disks is tilted at an approximately 2 to 6 degree angle (the "lift angle"), so that its top edge is tilted further away from a vertical plane facing the disk than its bottom edge. The two disks 160, 166 of an opposed disk pair tilt away from each other, and in one embodiment, each disk 160, 166 is tilted at a lift angle of approximately 3 degrees.

Figure 16:
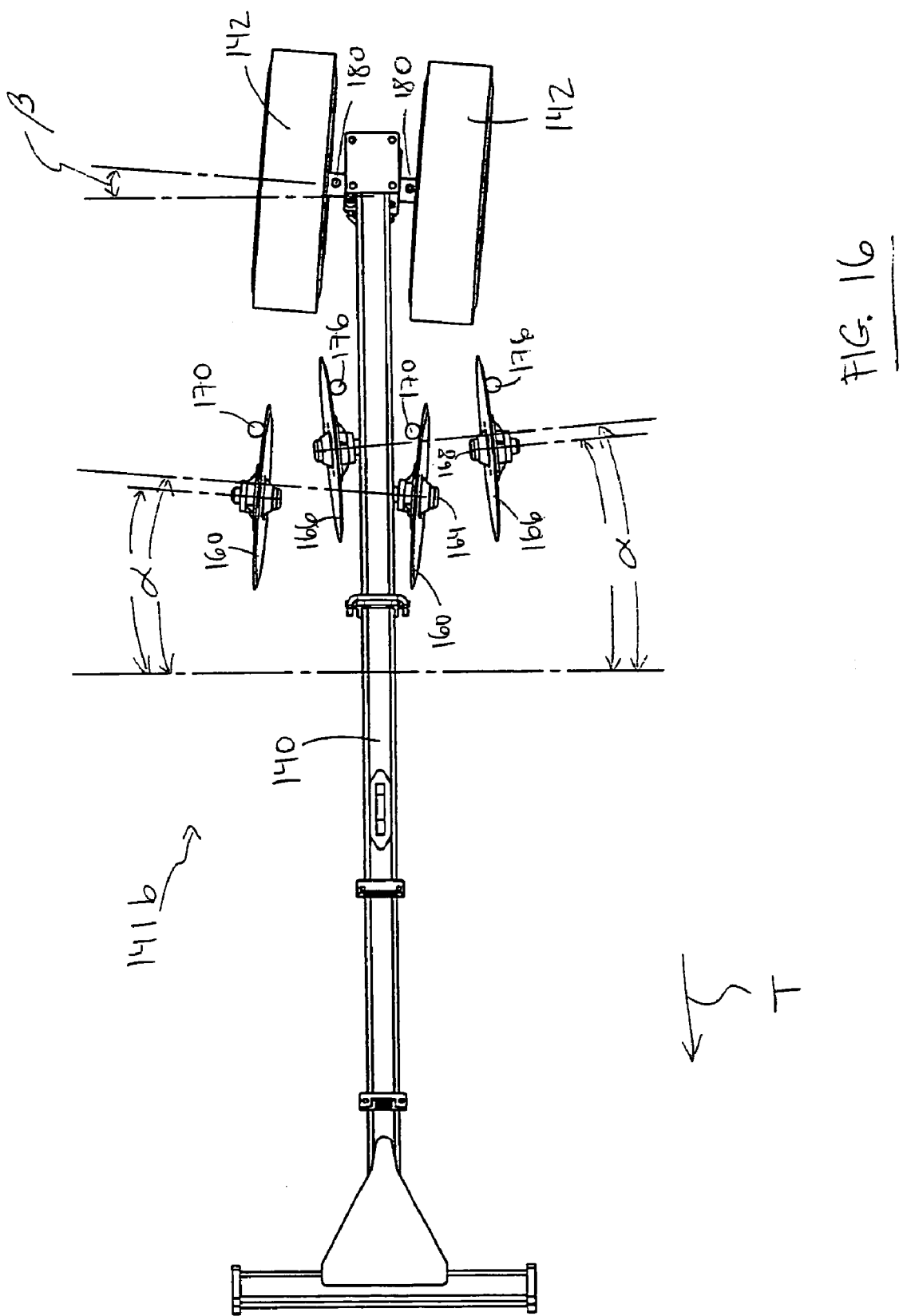
FIG. 16 is a schematic top view of one of the disk gang units 141b of FIG. 11.

In addition, the spindle 164, 168 of each disk 160, 166 is also disposed at an angle relative to a line extending laterally from the longitudinal bar 140. As seen in FIG. 16, each spindle 164, 168 is disposed at an angle α (the "shadow angle") relative to a lateral line extending from the bar 140, so that the rear edges of the disks 160, 166 of an opposed pair are closer than the leading edges of those disks. In one embodiment, the shadow angle α is approximately 3.5 to 8.5 degrees. In one specific embodiment, the shadow angle α for each disk is approximately 5 degrees. The angle α illustrated in FIG. 16 corresponds in general to the angle X in FIG. 1 of U.S. Pat. No. 7,216,596, for orientation purposes.

FIG. 16 illustrates one of the disk gang units 141b in schematic form (see, e.g., FIG. 12). As is realized from a review of FIG. 11, for each pair of opposed disks 160, 166 on a disk gang unit, one disk 160, 166 is aligned further ahead of its respective packing wheel 142 than the other 160, 166. In an exemplary embodiment, at the ground surface, a distance between seed packing wheel 142 and each disk 160, 166 is between about 8 and 16 inches. As viewed from the rear of the implement 125, for each disk gang unit 141a, the leading disk is the left disk of each opposed pair of disks. As viewed from the rear of the implement 125, for each disk gang unit 141b, the leading disk is the right disk of each opposed pair of disks. The fork 146 for an opposed pair of disks illustrated in FIGS. 13-15, 18 and 19 is arranged for use on one of the disk gang units 141a. A fork for use on a disk gang unit 141b would be similar to the fork 146 but oppositely disposed, as can be appreciated by a comparison of the disk gang units 141a and 141b in FIG. 11.

As noted above, the disks 160 and 166 of each pair are staggered longitudinally relative to one another. This arrangement is illustrated schematically in FIG. 17, where the stagger of the leading and trailing edges of the disks 60 and 66 are illustrated by longitudinal staggered distances $S_1$. The staggered distance $S_1$ may range from 0.25 to 8 inches, and in one embodiment may be a staggered distance $S_1$=4.625 inches. The staggering of equal diameter disks may be achieved by configuring the fork 146 as illustrated FIGS. 13-15, 18 and 19. As can be seen, the arms 150 and 152 are laterally spaced apart and opposed, but are likewise staggered longitudinally when mounted to the central portion 148.

In one embodiment, each pair of opposed disks 160 and 166 are adapted to form furrows approximately six inches apart, as measured from furrow center to furrow center, as illustrated by distance $D_1$ in FIG. 11. Seed packing wheel 142 has a width and/or orientation that allows it to pass over each of the furrows created by disks 160, 166. Because seed packing wheel 142 has a tread surface that rolls over each furrow rather than merely directing soil into the furrow, it is much more effective at packing the soil upon the newly sown seed. The distance between adjacent furrows of adjacent opposed pairs of disks is approximately nine inches, as measure from furrow center to furrow center, as illustrated by distance $D_2$ in FIG. 11. This extra spacing between adjacent disks of adjacent opposed pairs (and their respective arms) further mitigates the buildup of soil and field debris on the implement. This effect is further enhanced because the adjacent disks of adjacent opposed pairs (and their respective arms) are staggered longitudinally (such as illustrated by adjacent pair arm stagger distance $S_2$ in FIG. 11. The staggering of the disks 160 and 166 laterally across the implement 125 not only allows for better soil management, but leads to less field refuse collection by the implement, a problem which can ultimately cause the disks to stop turning, thereby decreasing the efficiency of seed planting and crop production.

As noted and explained above with respect to the first embodiment illustrated in FIGS. 1-10, an alternative arrangement for achieving staggered leading and trailing edges of the opposed paired disks would be to employ different diameter disks and a modified spindle support arm for the smaller sized disk in order for each disk to penetrate the ground the same distance for planting.

As noted above, when the soil is sticky, the offset of the disks reduces the transfer of soil from the rear of the rotating disk around to the front thereof as it moves across the field. The paired disks are arranged to turn the soil and cause the soil plowed from each furrow to collide between the two offset disks and settle into a single longitudinally extending soil pile, which then is packed and leveled out (over the seeds just deposited in the adjacent furrows) by the skewed packing wheel. Because each disk is skewed and tilted, some of the soil is actually lifted or tossed into the air as the furrow is formed. The airborne soil hits the trailing packing wheel and is then rolled and scuffed back to the ground by the packing wheel. In addition, each disk causes the dirt to turn over and smack into the dirt being turned over by the other disk of a pair of disks. Then the skewed packing wheel presses the dirt back down over the seed that has just been deposited behind each disk.

In the embodiment illustrated in FIGS. 11-19, each packing wheel 142 is skewed relative to a longitudinal axis of the implement 125 (while the packing wheels are skewed, they are not tilted like the disks). In FIG. 11, dashed line C indicates generally a lateral center line of the implement 125. As viewed from the rear of the implement 125, the packing wheels on the left side of the implement (for each disk gang unit 141*b*) are skewed with the leading edges of the packing wheels 142 disposed to the right relative to their trailing edges. Likewise, the packing wheels on the right side of the implement 125 (to the right of center line C when viewing the implement 125 from the rear) are skewed in an opposite manner. In other words, each of the packing wheels 142 on each disk gang unit 141*a* on the right side of the implement 125 is skewed so that its leading edge is disposed to the left of its trailing edge. In FIG. 11, only one disk gang unit 141*a* is shown attached to the implement frame 125. In an exemplary embodiment, half the packing wheels 142 on the implement 125 are skewed to the right and half the packing wheels 142 on the implement 125 are skewed to the left (although all are skewed with their leading edges toward the center line C). This arrangement balances out any tendency for the implement 125 to "drift" or "walk" sideways as it is pulled across a field because of interaction of the skewed packing wheels 142 with the ground. It is contemplated that the packing wheel skew orientations can be reversed, so that all of the packing wheels are skewed with their leading edges away from the center line C.

As seen in FIG. 11, the leading disk of each pair of opposed disks in front of a packing wheel 142 is farther from the packing wheel than the trailing disk. The packing wheel 142 is skewed similarly to that leading disk skew, which helps to allow the packing wheel to scuff dirt over and into the furrow formed by that disk. The packing wheel 142 scrapes or pulls some dirt sideways and packs dirt into the furrows (thus, closing the furrows) as the packing wheel 142 passes over the dirt in the furrow. As noted above, using two opposed disks 160, 166 working together creates loose dirt for the deposit of seed, and the design shown herein is intended to keep the dirt furrow open for seed reception.

Skewing the packing wheel 142 behind a pair of opposed disks 160, 166 at a slight angle relative to the longitudinal movement of the implement 125 causes the packing wheel 142 to scuff the dirt as it rolls over the loose dirt that has just been turned by the two opposed disks 160, 166 and shove that dirt back into the furrow to fill it with dirt. This packing wheel 142 orientation allows the packing wheel 142 to stay cleaner during use, and also pushes some dirt back into the rows opened by the disks 160, 166. Even on a skewed lateral axis, the packing wheel 142 continues to rotate and provides leveling and packing of the loose turned soil from the disks 160, 166 over the seed which has been deposited periodically behind each disk 160, 166 as the implement 125 moves across the field. In one embodiment, each packing wheel 142 is a 15-inch diameter wheel with a six-inch wide tread. Because the packing wheel is skewed, its lateral "footprint" as it moves across the field is thus larger than its six-inch tread width. Thus, a wider seed packing wheel footprint is achieved without requiring the use of a wider wheel. This allows for maintenance of the clearance space between disks 60, 66 and seed packing wheel 142, which prevents undesirable soil buildup therebetween.

As seen in FIG. 16, each packing wheel 142 is disposed at an acute angle β relative to a lateral line extending from the bar 140. In one embodiment, the angle β is the same as the angle α, although the angle β can range from approximately 3.5 to 8.5 degrees. In one specific embodiment, the angle β is approximately 5 degrees. As illustrated in FIGS. 12 and 16, each packing wheel 142 is rotatably supported on a lateral spindle 180 which in turn is attached to the longitudinal bar 140. Although disclosed in an exemplary embodiment having two staggered disc drills, it is contemplated that an implement having one or more skewed packing wheels may take many forms, such as one opener per packing wheel, staggered packing wheels, wheels skewed at different angles, etc.

The disclosed paired disk implement has many advantages over competitive similar dual disk drills in the industry. Low cost and ease of maintenance, ability to seed equally well in conventional and no-till conditions, ease of operator adjustments and fertilizer options are all improvements to competitive offerings.

Another advantage of the design of the disclosed implement is that the quality of the seeding job is not affected by speed. Because the wakes of dirt coming off of the blades collide, the energy is absorbed and the dirt falls in front of the packer wheel uniformly at almost any speed. This is a unique attribute of the paired disk design.

When heavy wet soil is encountered, that presents an operational problem that could otherwise limit the market for a paired disk implement with mirror image disk pairs. Because the disks squeeze and lift the soil as a result of the paired disk configuration, at times soil comes around with the disks and may be deposited in front of one or both of the disks. This would cause a void in the seed row where the soil was removed and a hump where the soil was deposited. The unwanted result is a non-uniform seed row and unevenly covered seed.

Offsetting the disks of each pair front to rear (i.e., longitudinally) by 0.25 to 8 inches eliminates this undesirable action. It appears that by having the disks a bit offset, they do not hold (compress and lift) the soil uniformly enough to pick it up.

As noted above, another means to remedy the problem would be to use different size disks (without the necessity of offsetting the spindles of the disks of a pair of disks). In addition to the fact that the leading and/or trailing edges of the paired disks would be offset longitudinally, it is believed that the smaller blade having to spin faster would break up the uniformity of the lift enough to prevent soil from coming around.

Although the agricultural seeder implement disclosed herein has been described with respect to several embodiments, workers skilled in the art will recognize that changes may be made in form and detail without departing from the spirit and scope of the agricultural seeder implement disclosure.

The invention claimed is:

1. A seeder implement having a longitudinal direction of travel on a ground surface comprising:
    a fork comprising:
        a first spindle support arm that supports a first spindle; and
        a second spindle support arm that supports a second spindle;
        a first disk drill supported on the first spindle, wherein the first spindle is oriented in a first orientation and at a first acute angle relative to a lateral line perpendicular to the longitudinal direction of travel, and wherein the first disk drill is oriented at a second acute angle relative to the ground surface; and
        a second disk drill supported on the second spindle, wherein the second spindle is oriented in a second orientation and at a third acute angle relative to the lateral line perpendicular the longitudinal direction of travel and wherein the second disk drill is oriented at a fourth acute angle relative to the ground surface;
    wherein the first disk drill is longitudinally offset ahead of the second disk drill; and
    wherein there are no structural components between the first and second disk drills other than the first and second spindles.

2. The implement of claim 1 wherein the first and third angles are the same.

3. The implement of claim 1 wherein the second and fourth angles are the same.

4. The implement of claim 1 wherein the first and second orientations are opposite.

5. The implement of claim 1 further comprising a seed packing wheel longitudinally displaced from the first and second disk drills.

6. The implement of claim 5 wherein the first disk drill creates a first furrow and the second disk drill creates a second furrow in the ground surface, and wherein the packing wheel has a width that allows it to travel over both the first and second furrows as the implement travels in the longitudinal direction.

7. The implement of claim 5 wherein the first disk drill creates a first furrow and the second disk drill creates a second furrow in the ground surface, and wherein the packing wheel has an orientation that allows it to travel over both the first and second furrows as the implement travels in the longitudinal direction.

8. The implement of claim 5 wherein the seed packing wheel is mounted on an axle oriented at a fifth acute angle relative to the lateral line perpendicular to the longitudinal direction of travel.

9. The implement of claim 8 wherein the seed packing wheel is mounted on an axle having the first orientation.

10. The implement of claim 1 wherein a longitudinal offset between the first disk drill and the second disk drill is greater than or equal to 0.25 inch.

11. The implement of claim 1 wherein a longitudinal offset between the first disk drill and the second disk drill is less than or equal to 8 inches.

12. A seeder implement having a longitudinal direction of travel on a ground surface comprising:
    a fork comprising:
        a first spindle support arm that supports a first spindle; and
        a second spindle support arm that supports a second spindle;
        a first disk drill supported on the first spindle, wherein the first spindle is oriented in a first orientation relative to the longitudinal direction of travel; and
        a second disk drill supported on the second spindle, wherein the second spindle is oriented in a second orientation opposite the first orientation relative to the longitudinal direction of travel; and
        a seed packing wheel longitudinally displaced from the first and second disk drills, wherein the seed packing wheel is mounted on an axle oriented in the first orientation;
    wherein the first disk drill creates a first furrow and the second disk drill creates a second furrow in the ground surface, and wherein the packing wheel travels over both the first and second furrows as the implement travels in the longitudinal direction.

13. The implement of claim 12 wherein the first disk drill is longitudinally offset ahead of the second disk drill.

14. The implement of claim 13 wherein a longitudinal offset between the first disk drill and the second disk drill is greater than or equal to 0.25 inch.

15. The implement of claim 13 wherein a longitudinal offset between the first disk drill and the second disk drill is less than or equal to 8 inches.

16. A seeder implement having a longitudinal direction of travel on a ground surface and a center longitudinal line, the implement comprising:
    a first fork positioned on a first side of the center longitudinal line, the first fork comprising:
    a first spindle support arm that supports a first spindle; and
    a second spindle support arm that supports a second spindle;
    a first disk drill supported on the first spindle, wherein the first spindle is oriented in a first orientation relative to the longitudinal direction of travel; and
    a second disk drill supported on the second spindle, wherein the second spindle is oriented in a second orientation opposite the first orientation relative to the longitudinal direction of travel;
    a first seed packing wheel longitudinally displaced from the first and second disk drills, wherein the first seed packing wheel is mounted on an axle oriented in the first orientation;
    a second fork positioned on a second side of the center longitudinal line, the second fork comprising:
        a third spindle support arm that supports a third spindle; and
        a fourth spindle support arm that supports a fourth spindle;
    a third disk drill supported on the third spindle, wherein the third spindle is oriented in the second orientation; and
    a fourth disk drill supported on the fourth spindle, wherein the fourth spindle is oriented in the first orientation; and
    a second seed packing wheel longitudinally displaced from the third and fourth disk drills, wherein the second seed packing wheel is mounted on an axle oriented in the second orientation.

17. The implement of claim 16
    wherein the first disk drill is longitudinally offset ahead of the second disk drill and wherein the third disk drill is longitudinally offset ahead of the fourth disk drill.

18. The implement of claim 16 wherein there are no structural components between the first and second disk drills other than the first and second spindles and
wherein there are no structural components between the third and fourth disk drills other than the third and fourth spindles.

19. The implement of claim 16 wherein the first disk drill creates a first furrow and the second disk drill creates a second furrow in the ground surface, and wherein the first packing wheel travels over both the first and second furrows as the implement travels in the longitudinal direction; and
wherein the third disk drill creates a third furrow and the fourth disk drill creates a fourth furrow in the ground surface, and wherein the second packing wheel travels over both the third and fourth furrows as the implement travels in the longitudinal direction.

20. A seeder implement having a longitudinal direction of travel on a ground surface comprising:
a fork comprising:
a first spindle support arm that supports a first spindle; and
a second spindle support arm that supports a second spindle;
a first disk drill supported on the first spindle, wherein the first spindle is oriented in a first orientation and at a first acute angle relative to a lateral line perpendicular to the longitudinal direction of travel, and wherein the first disk drill is oriented at a second acute angle relative to the ground surface; and
a second disk drill supported on the second spindle, wherein the second spindle is oriented in a second orientation and at a third acute angle relative to the lateral line perpendicular the longitudinal direction of travel and wherein the second disk drill is oriented at a fourth acute angle relative to the ground surface;
wherein the first disk drill and the second disk drill have different diameters.

* * * * *

UNITED STATES PATENT AND TRADEMARK OFFICE
CERTIFICATE OF CORRECTION

PATENT NO. : 8,356,564 B2  Page 1 of 1
APPLICATION NO. : 12/739526
DATED : January 22, 2013
INVENTOR(S) : Breker et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 357 days.

Signed and Sealed this
First Day of September, 2015

Michelle K. Lee
*Director of the United States Patent and Trademark Office*